(12) United States Patent
Sakai et al.

(10) Patent No.: US 7,270,205 B2
(45) Date of Patent: Sep. 18, 2007

(54) VEHICLE DRIVE DEVICE, AND FRONT-AND-REAR WHEEL-DRIVEN VEHICLE FORMED OF THE DEVICE

(75) Inventors: Toshifumi Sakai, Okazaki (JP); Naoyuki Sakai, Anjo (JP); Akihiro Ohno, Okazaki (JP); Hiroshi Takuno, Nukata-gun (JP); Hiroshi Kushino, Obu (JP)

(73) Assignee: JTEKT Corporation, Osaka (JP)

( * ) Notice: Subject to any disclaimer, the term of this patent is extended or adjusted under 35 U.S.C. 154(b) by 327 days.

(21) Appl. No.: 10/502,641

(22) PCT Filed: May 22, 2003

(86) PCT No.: PCT/JP03/06369

§ 371 (c)(1),
(2), (4) Date: Aug. 2, 2004

(87) PCT Pub. No.: WO03/097397

PCT Pub. Date: Nov. 27, 2003

(65) Prior Publication Data

US 2005/0115755 A1    Jun. 2, 2005

(30) Foreign Application Priority Data

May 22, 2002 (JP) ............................ 2002-147695
Aug. 6, 2002 (JP) ............................ 2002-228480

(51) Int. Cl.
*F16H 57/04* (2006.01)

(52) U.S. Cl. ..................................... 180/65.6; 475/231

(58) Field of Classification Search ............... 180/65.6, 180/65.2, 65.3; 475/223, 230, 231, 224, 475/239, 238, 246, 247, 150, 160, 159, 198–206
See application file for complete search history.

(56) References Cited

U.S. PATENT DOCUMENTS

| 3,448,635 | A  | * | 6/1969  | Nelson ........................ 475/160 |
| 5,030,181 | A  | * | 7/1991  | Keller ......................... 475/150 |
| 5,352,164 | A  |   | 10/1994 | Bensinger et al. |
| 5,385,513 | A  | * | 1/1995  | Ishii et al. ................... 475/203 |
| 6,436,002 | B1 | * | 8/2002  | Ishikawa et al. ............. 475/231 |
| 6,460,677 | B1 | * | 10/2002 | Roscoe ....................... 192/84.7 |
| 6,770,005 | B2 | * | 8/2004  | Aikawa et al. ................ 475/5 |
| 6,832,972 | B2 | * | 12/2004 | Ishikawa ..................... 475/223 |
| 7,022,040 | B2 | * | 4/2006  | DeGowske et al. ......... 475/231 |

(Continued)

FOREIGN PATENT DOCUMENTS

EP              1142743           10/2001

(Continued)

*Primary Examiner*—J. A Shriver
(74) *Attorney, Agent, or Firm*—Oblon, Spivak, McClelland, Maier & Neustadt, P.C.

(57) ABSTRACT

A vehicle drive device 20 is composed of an electric motor 20a, a differential gear 20d for distributing and transmitting the drive power from the electric motor 20a to right and left drive wheels, and a clutch 20c for making intermittent the coupling capable of transmitting the drive power between the differential gear 20d side and the electric motor 20a side. The clutch 20c is of the type having a self-locking function and is arranged coaxially of the differential gear 20d at one side of the differential gear 20d.

9 Claims, 16 Drawing Sheets

U.S. PATENT DOCUMENTS

| | | | |
|---|---|---|---|
| 7,094,172 B2 * | 8/2006 | Ishikawa | 475/231 |
| 7,137,921 B2 * | 11/2006 | DeGowske | 475/231 |
| 7,156,771 B2 * | 1/2007 | Teraoka | 477/5 |

FOREIGN PATENT DOCUMENTS

| | | |
|---|---|---|
| JP | 61-44031 | 3/1986 |
| JP | 5-38956 | 2/1993 |
| JP | 9-301002 | 11/1997 |
| JP | 11-291774 | 10/1999 |
| JP | 2000-104759 | 4/2000 |
| JP | 2001-82512 | 3/2001 |

* cited by examiner

Condition for Self-Locking
$F \cdot \sin\theta \cdot R1 < F \cdot \cos\theta \cdot \mu \cdot R2$
Hence,
$\theta < \tan^{-1}(\mu \cdot R2/R1)$

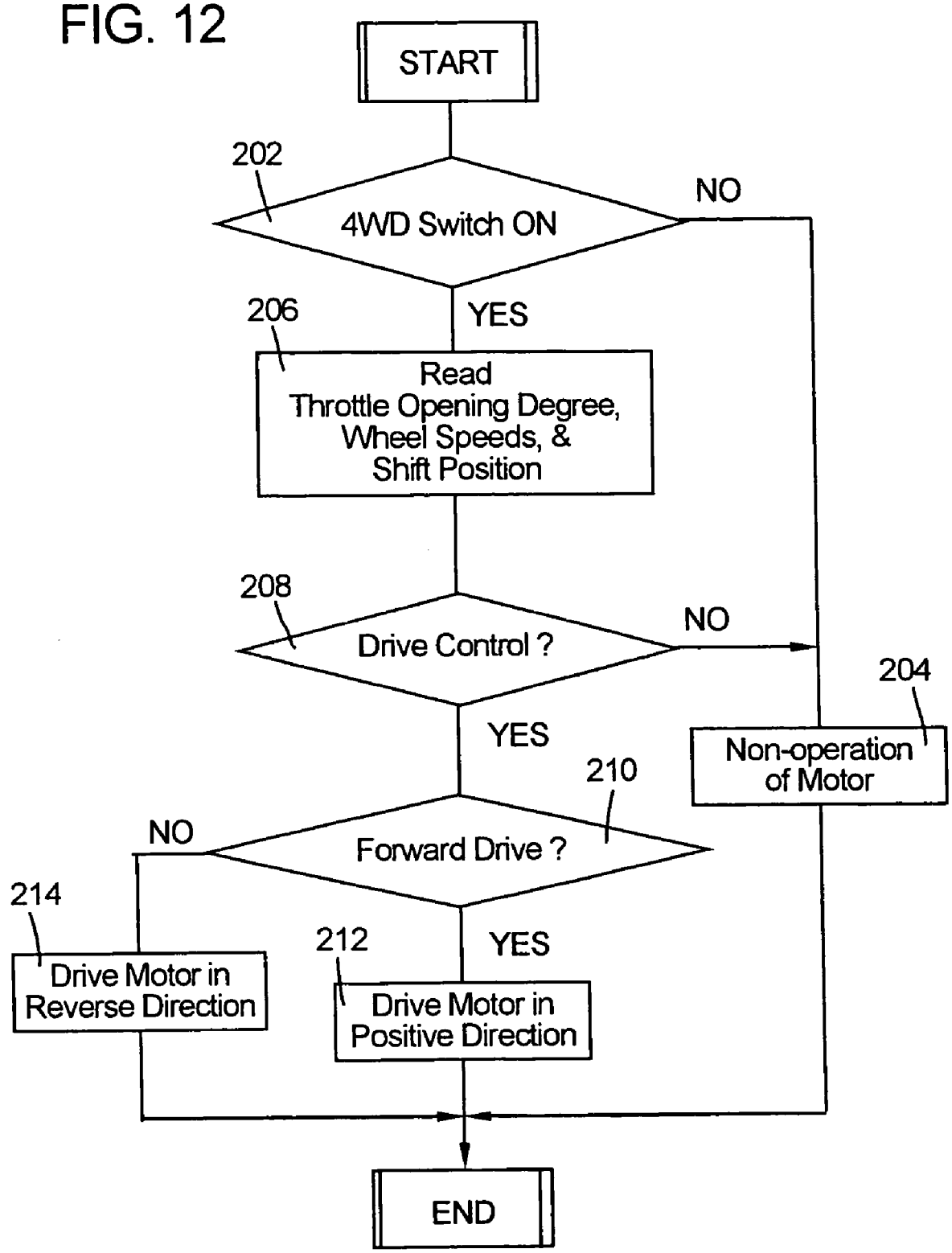

VEHICLE DRIVE DEVICE, AND FRONT-AND-REAR WHEEL-DRIVEN VEHICLE FORMED OF THE DEVICE

TECHNOLOGICAL FILED

The present invention relates to a vehicle drive device and a front-and-rear wheel drive vehicle constituted thereby.

BACKGROUND ART

As one type of vehicle drive devices, there is a vehicle drive device of the type that is provided with an electric motor, a differential gear for distributing and transmitting the power output from the electric motor to right and left drive wheels, and a clutch for making intermittent the coupling which is able to transmit the power between the differential gear and the electric motor. The vehicle drive device of this type is designed to discontinue the coupling state in which the power transmission is possible between the electric motor side and the drive wheel side while the electric motor for driving the drive wheels is stopped from being driven.

Further, as one type of front-and-rear wheel drive vehicles, there is a front-and-rear wheel drive vehicle which is provided with a prime drive device for driving prime drive wheels and a secondary drive device for driving secondary drive wheels and which is brought into a single drive traveling state of the prime drive wheels by the operation of the prime drive device or into a front and rear dual wheel drive traveling state by the operations of the dual drive devices including the prime drive device and the secondary drive device.

In the front-and-rear drive vehicle of this type, it is preferable that the coupling between secondary drive means and a drive power transmission path for the secondary drive wheels is kept disconnected in the single drive traveling state of the prime drive wheels by the operation of the prime drive device, and generally, there is taken a construction that a clutch is incorporated into drive power transmission means which couples the secondary drive means with the secondary drive wheels.

As the clutch for this purpose, there is used any of clutches of various kinds such as an electrically operable electromagnetic clutch, a pressure-type clutch which is operable under pressure such as hydraulic pressure, pneumatic pressure or the like, a mechanical clutch operable to be driven by secondary drive means. Of these clutches, a mechanical clutch may be chosen for the reason that any drive circuit of electric, hydraulic or pneumatic type is unnecessary, and a two-way clutch may be chosen for the reason that it has the function to perform the coupling and uncoupling in the both traveling directions including the forward traveling direction and the reverse traveling direction of the vehicle. Where the two-way clutch is chosen as the clutch, the secondary drive means and the secondary drive wheels are coupled by drive power transmission means incorporating the two-way clutch therein, thereby to constitute the secondary drive device.

In the front-and-rear wheel drive vehicle of this type, where the vehicle is provided with the secondary drive device incorporating the two-way clutch, the same is kept in the uncoupling state irrespective of the traveling direction of the vehicle during the single drive traveling by the operation of the prime drive wheels. Further, during the front and rear dual wheel drive traveling, the two-way clutch is brought by the secondary drive means of the secondary drive device into the coupling state for the vehicle traveling direction to transmit the drive power from the secondary drive means to the secondary drive wheels.

That is, during the front and rear dual wheel drive traveling, the front-and-rear drive vehicle is placed in the forward traveling state by driving the secondary drive means in the positive-going direction and is placed in the reverse traveling state by driving the secondary drive means in the reverse direction. In this case, the two-way clutch is kept in the coupling state for the forward traveling direction by the operation of the secondary drive means in the positive-going direction, or is placed in the coupling state for the reverse traveling direction by the operation of the secondary drive device in the reverse direction. Thus, the front and rear dual wheel drive traveling can be done in either of the forward and reverse directions of the vehicle.

By the way, downsizing, lightening and reduction in cost are requirements in the foregoing vehicle drive device. The present invention is aimed to cope with these requirements, with a view at the place for the clutch to be arranged at and/or the downsizing of the clutch. That is, an object of the present invention is to improve the capability of being mounted on the vehicle, to simplify the suspension system, to improve fuel consumption and to realize reduction in cost by downsizing and lightening a vehicle drive device of the aforementioned type.

Further, in the foregoing front-and-rear wheel drive vehicle, during the single traveling by the prime drive wheels, the secondary drive means is in the out-of-operation state, and the two-way clutch is held in an intermediate zone of the coupling states for both of the forward and reverse traveling directions. Thus, when the vehicle repeats the forward traveling and the reverse traveling in this state, the two-way clutch tends to generate dragging torque thereby to cause energy loss. Additionally, by the cause of the dragging torque generated in the two-way clutch, a problem arises in that the two-way clutch is brought into the coupling state, whereby the energy loss is further increased and whereby the drive torque of the secondary drive wheel side is transmitted to the secondary drive means side. Accordingly, another object of the present invention is to cope with these problems.

DISCLOSURE OF THE INVENTION

The present invention resides in a vehicle drive device for distributing the power from secondary drive means through a differential gear to right and left drive wheels wherein the drive device employs a clutch to make intermittent the power transmission from the secondary drive means to the differential gear. The clutch is arranged coaxially of the differential gear at one side of the differential gear. With this arrangement, since the clutch is arranged at one side of the differential gear, the clutch can be constituted to be smaller in diameter compared with the clutch arranged on the outer circumference of the differential gear, so that the vehicle drive device can be lightened and downsized. Therefore, the vehicle drive device can be improved in the capability of being mounted on the vehicle, can simplify the suspension system of the vehicle, can be improved in fuel consumption and can be less expensive in price. Further, the dragging torque during the torque uncoupling can be made smaller as a result that the clutch can be constituted to be smaller in diameter.

Further, the present invention resides in a vehicle drive device for distributing the power from secondary drive means through a differential gear to right and left drive wheels wherein the drive device employs a clutch to make intermittent the power transmission from the secondary driven means to the differential gear. The clutch is of the type having a self-locking function. Where transmission torque is taken as criterion for judgment, the clutch with the self-locking function can be constituted to be smaller, lighter and less expensive compared with conventional clutches. Thus, the vehicle drive device can be improved in the capability of being mounted on the vehicle, can simplify the suspension system of the vehicle, can be improved in fuel consumption and can be less expensive in price.

Further, the present invention resides in a vehicle drive device for distributing the power from secondary drive means through a differential gear to right and left drive wheels wherein the drive device employs a clutch to make intermittent the power transmission from the secondary drive means to the differential gear. The clutch is of the type having a self-locking function and is arranged coaxially with the differential gear at one side of the differential gear. With this construction, since there is taken such a construction that a clutch with the self-locking function is used as clutch and is arranged at one side of the differential gear, there can be attained function and effect which are the same or higher than those attained by the foregoing vehicle drive device.

Further, the present invention resides in that the clutch of the foregoing vehicle drive device is an electromagnetic clutch of the self-locking type, which is composed of an annular outer member, an electromagnetic coil contained in a body of the outer member, an armature located outside of the outer member and attractable to be brought into friction engagement with the outer side of the outer member when electric current is applied to the electromagnetic coil, an inner member located at the inner side of the outer member coaxially of the same, and a cam mechanism arranged between the inner member and the armature for connecting both of these member when operated. The outer member is connected to a transmission member for the power output from an electric motor, the inner member is connected to a differential case being a component of the differential gear, and the cam mechanism takes the armature as first cam member and a part of the differential case as second cam member and is constituted by interposing cam followers between the both cam members. With this construction, the electromagnetic clutch can be arranged to be compact at one side of the differential gear.

Further, the present invention resides in a vehicle drive device for distributing the power from secondary drive means through a differential gear to right and left drive wheels wherein the drive device employs a clutch to make intermittent the power transmission from the secondary drive means to the differential gear. The clutch is arranged coaxially of the differential gear at one side thereof and is constituted by a two-way clutch. With this configuration, since the clutch is arranged at one side of the differential gear, the clutch can be constituted to be smaller in diameter compared with that arranged at the outer circumference of the differential gear. Accordingly, the vehicle drive device is improved in the capability of being mounted on the vehicle, can simplify the suspension system of the vehicle, can be improved in fuel consumption and can be less expensive in price. In addition, the dragging torque during the torque uncoupling can be made smaller as a result that the clutch can be constituted to be smaller in diameter.

Further, in the present invention, the clutch is controlled into the coupling state for the vehicle traveling direction by driving the secondary drive means in the vehicle traveling direction. With this construction, since the coupling direction of a two-way clutch being the clutch is made coincide with the vehicle traveling direction, the generation of the dragging torque in the two-way clutch can be restrained thereby to prevent energy from being lost due to the dragging torque, and the coupling state of the two-way clutch caused by the dragging torque can be prevented from occurring and the energy loss caused thereby can be prevented from occurring.

Further, the present invention resides in a front-and-rear drive vehicle which is provided a prime drive device for driving prime drive wheels and a secondary drive device for driving secondary drive wheels and is capable of being brought into a single drive traveling state of the prime drive wheels by the operation of the prime drive device or into a front and rear dual wheel drive traveling state by the operations of the dual drive devices including the prime drive device and the secondary drive device. Secondary drive means constituting the secondary drive device and the secondary drive wheels are coupled through driven power transmission means incorporating a two-way clutch therein. When the vehicle is in the single drive traveling state of the prime drive wheels, the two-way clutch is controlled into the coupling state for the vehicle traveling direction by driving the secondary drive means in the vehicle traveling direction. With this configuration, since the coupling direction of the two-way clutch is made coincide with the vehicle traveling direction during the single traveling of the prime drive wheels, the generation of the dragging torque in the two-way clutch can be restrained thereby to prevent energy from being lost due to the dragging torque, and the coupling state of the two-way clutch caused by the dragging torque can be prevented from occurring, and the energy loss caused thereby can be prevented from occurring. In addition, it can be prevented that the drive torque is caused thereby to be transmitted from the secondary drive wheel side to the secondary drive means side.

Further, the present invention resides in a front-and-rear drive vehicle which is provided a prime drive device for driving prime drive wheels and a secondary drive device for driving secondary drive wheels and is capable of being brought into a single drive traveling state of the prime drive wheels by the operation of the prime drive device or into a front and rear dual wheel drive traveling state by the operations of the dual drive devices including the prime drive device and the secondary drive device. Secondary drive means constituting the secondary drive device and the secondary drive wheels are coupled through driven power transmission means incorporating a two-way clutch therein. The two-way clutch can be controlled into the coupling state for the vehicle traveling direction by driving the secondary drive means in the vehicle traveling direction irrespective of whether the traveling state of the vehicle is the single drive traveling state or the dual wheel drive traveling state. With the construction, since the coupling direction of the two-way clutch is made coincide with the vehicle traveling direction during either of the single traveling by the prime drive wheels and the front and rear dual wheel drive traveling, the generation of the dragging torque in the two-way clutch can be restrained thereby to prevent energy from being lost due to the dragging torque, and the coupling state of the two-way clutch caused by the dragging torque can be prevented from occurring, and the energy loss caused thereby can be prevented from occurring. In addition, it can be prevented that the drive torque is caused thereby to be transmitted from the secondary drive wheel side to the secondary drive means side.

Further, in the present invention, when the vehicle speed is increased from under a predetermined value to over the predetermined value, the two-way clutch is controlled into the coupling state for the vehicle traveling direction by driving the secondary drive means in the vehicle traveling direction. With this construction, even if the vehicle traveling direction is uncertain or indistinct to rely on the shift position in a low speed traveling like the time of a slope starting, the switching state in the coupling direction of the two-way clutch can be kept in an exact state before the vehicle speed is further increased, by performing the manipulation to switch the coupling direction of the two-way clutch again when the change of the vehicle speed from a low speed to a medium speed makes it possible to reliably judge that the vehicle is traveling in the same direction as the shift position.

Further, in the present invention, the two-way clutch is controlled into the coupling state for the vehicle traveling direction by driving the secondary drive means in the vehicle traveling direction when the vehicle speed is increased to a predetermined value or higher. With this construction, the coupling direction of the two-way clutch can be prevented from being changed from the vehicle traveling direction to the reverse direction by the cause of something like vibrations during high speed traveling.

Further, in the present invention, controlling the coupling direction of the two-way clutch can be done by driving the secondary drive means temporarily. The coupling direction of the two-way clutch can be prevented from being changed from the vehicle traveling direction to the reverse direction by the cause of vibrations or the like during high speed traveling, and the electric power for operating the secondary drive means can be reduced by the intermittent operation.

Further, in the present invention, controlling the coupling direction of the two-way clutch is done by making the driving of the secondary drive means intermittent periodically. The coupling direction of the two-way clutch can be prevented from being changed from the vehicle traveling direction to the reverse direction by the cause of vibrations or the like during high speed traveling, and the electric power for operating the secondary drive means can be reduced by the intermittent operation.

Further, in the present invention, controlling the coupling direction of the two-way clutch is done by driving the secondary drive means continuously when the vehicle speed is a predetermined speed or higher. With the construction, the coupling direction of the two-way clutch can reliably be prevented from being changed from the vehicle traveling direction to the opposite direction by the cause of vibration or the like during high speed traveling.

BRIEF DESCRIPTION OF THE DRAWINGS

FIG. 12 is a flowchart for executing a control program which controls the operation of the secondary drive device;

PREFERRED EMBODIMENTS TO PRACTICE THE INVENTION a) First Embodiment

Figure 1:
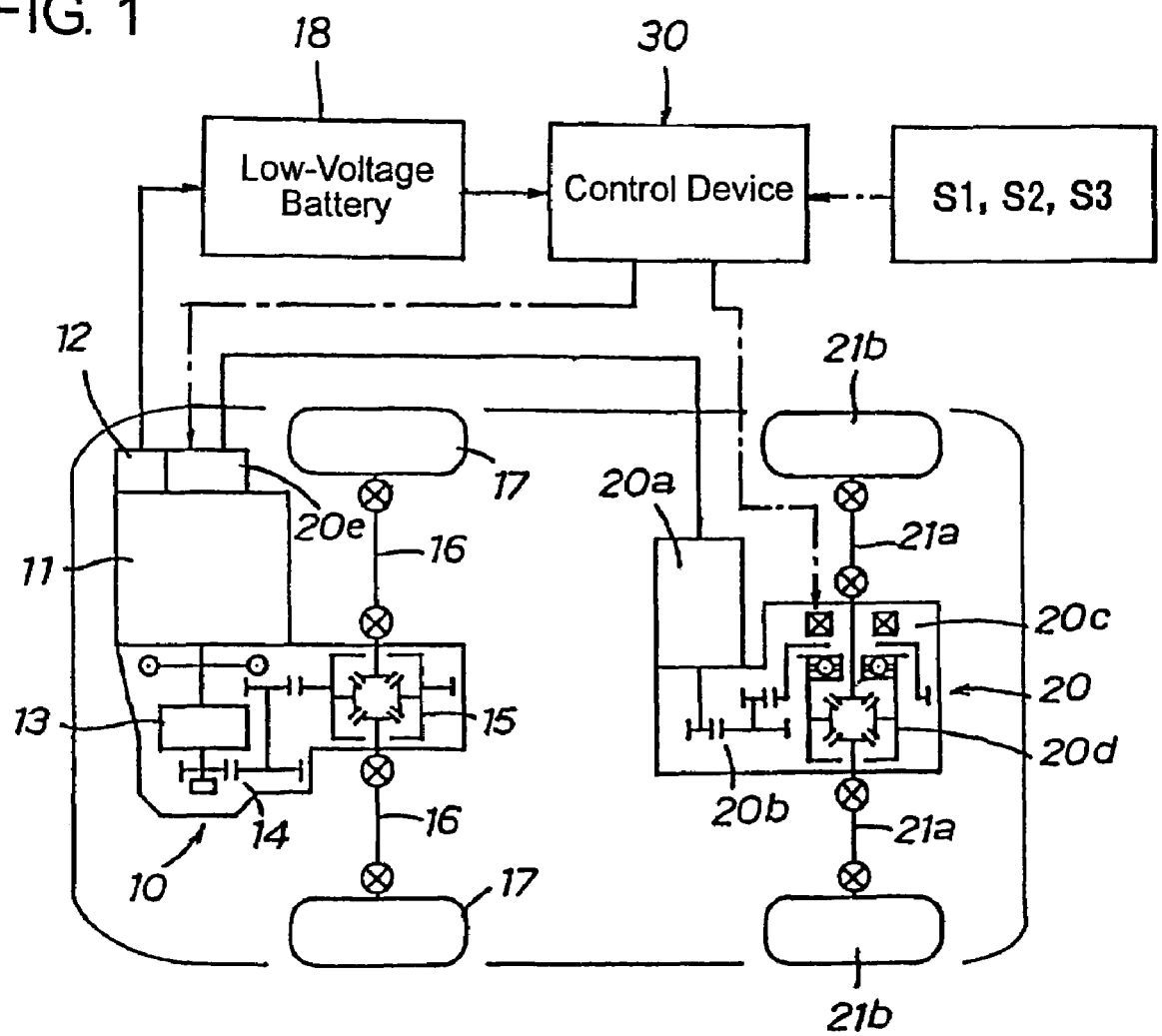
FIG. 1 is a schematic view showing the construction of a front-and-rear drive vehicle which incorporates as secondary drive device a vehicle drive device in one embodiment according to the present invention.
Figure 2:
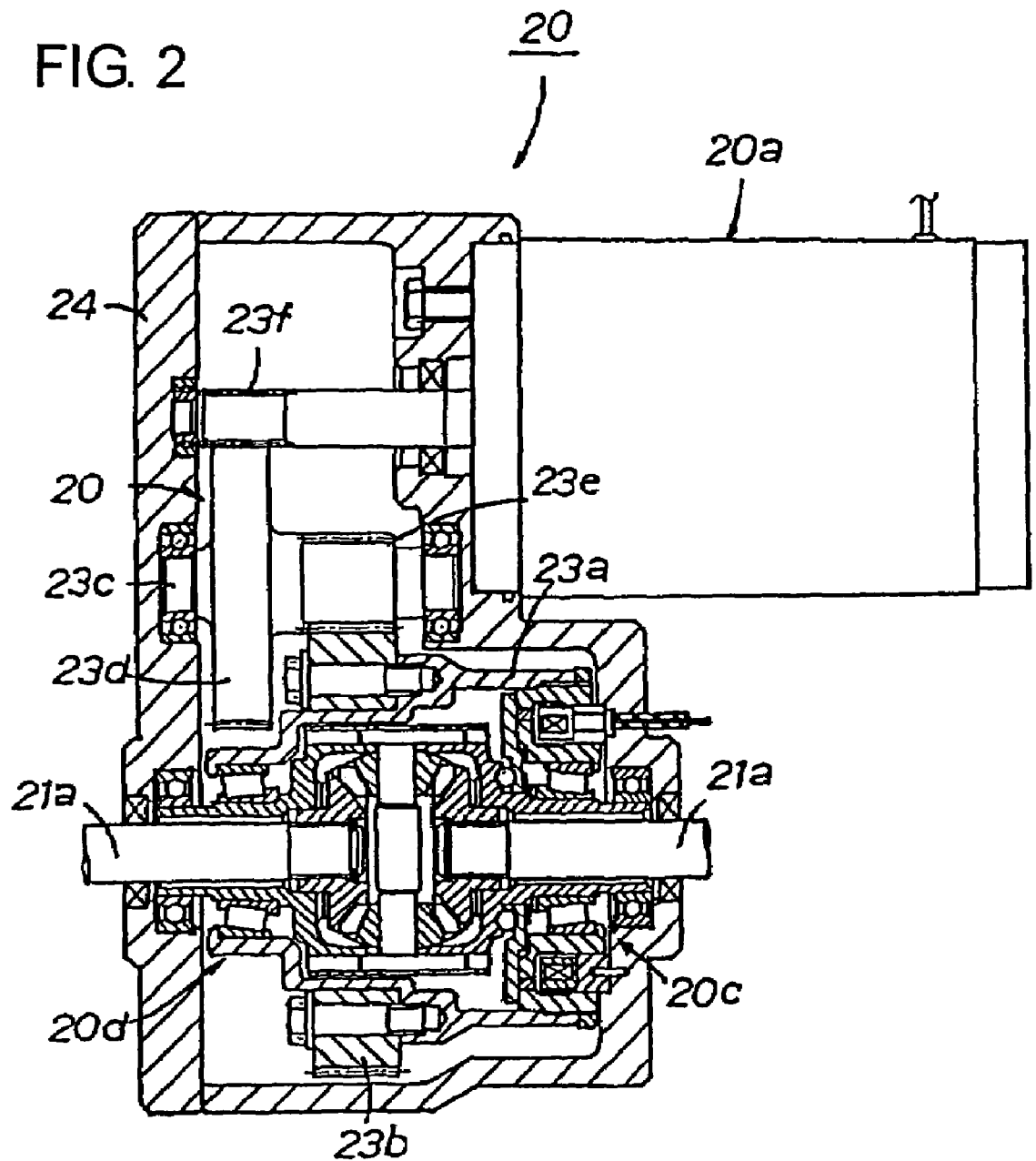
FIG. 2 is a horizontal plan view partly in section of the secondary drive device.
Figure 3:
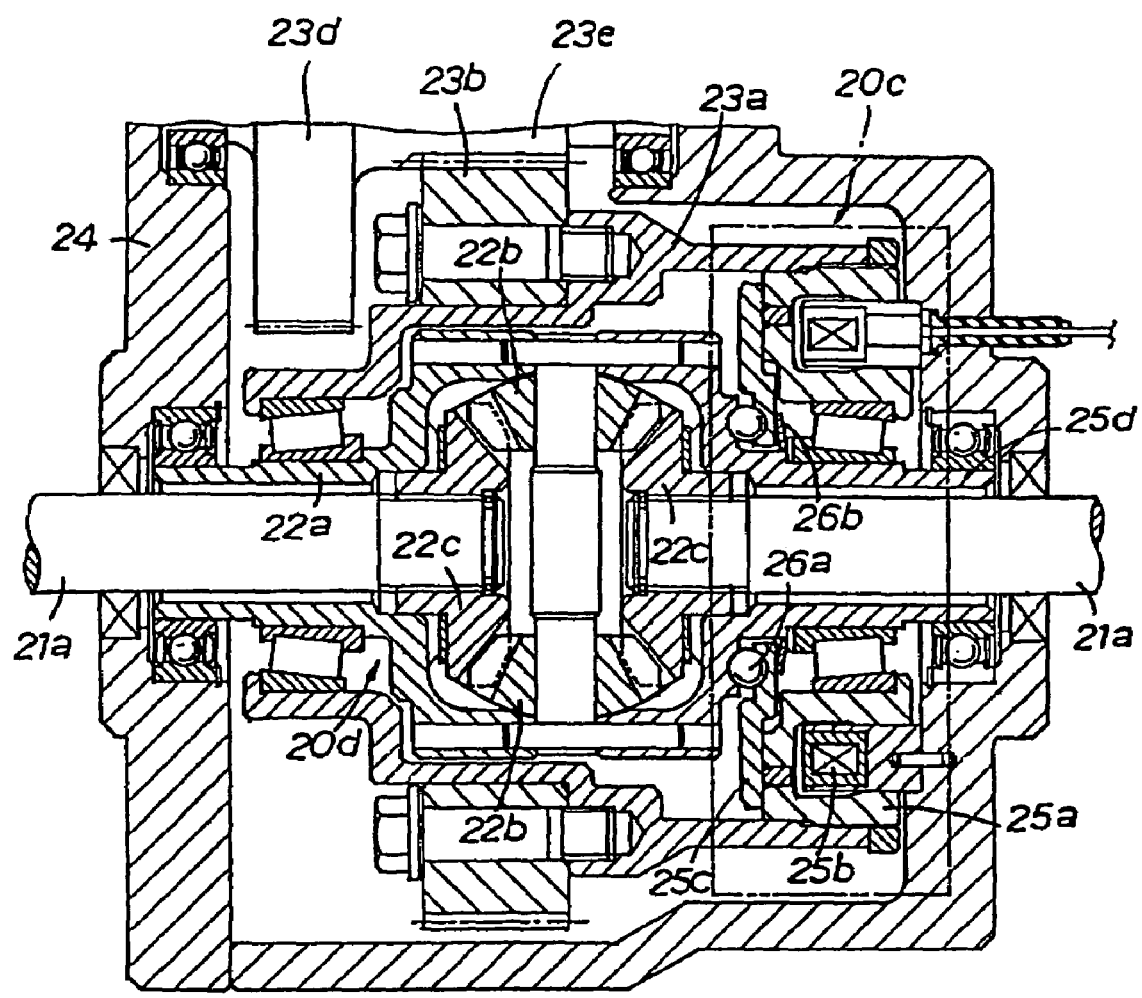
FIG. 3 is a horizontal plane view showing a partial construction (electromagnetic clutch and rear differential) of the secondary drive device.

Hereinafter, an embodiment will be described with reference to the drawings in order to describe the present invention in detail. FIG. 1 shows a front-and-rear wheel drive vehicle mounting a vehicle drive device in the first embodiment according to the present invention. The front-and-rear wheel drive vehicle is provided with a prime drive device 10 for driving front wheels being prime drive wheels, a secondary drive device 20 for driving rear wheels being secondary drive wheels, and a control device 30. In the front-and-rear wheel drive vehicle, a vehicle drive device as one example according to the present invention is utilized as the secondary drive device 20. FIGS. 2 and 3 show the secondary drive device 20 in detail.

The prime drive device 10 constituting the front-and-rear wheel drive vehicle is provided with an engine 11 as combustion engine and a first generator 12 for low-voltage generation. In the prime drive device 10, the drive power from the engine 11 is transmitted to each of the drive shafts 16 through a transmission 13, a reduction gear train 14 and a front differential 15, and front wheels 17 are driven by the drive shafts 16. During this time, the engine 11 drives the first generation 12 thereby to generate electric power of a low voltage. The generated electric power is accumulated in a low-voltage battery 18. The low-voltage battery 18 is a battery for driving accessories and is a 12-volt battery, for example.

The secondary drive device 20 is provided with an electric motor 20a as secondary drive means, a reduction gear train 20b, an electromagnetic clutch 20c, a rear differential 20d and a second generator 20e for generating electric power of a high voltage. The second generator 20e is connected to a crankshaft of the engine 11 and is driven by the engine 11 to generate electric power of a high voltage.

The electric power generated by the second generator 20e is supplied to the electric motor 20a thereby to drive the same. The drive power of the electric motor 20a is transmitted to the reduction gear train 20b, the electromagnetic clutch 20c and the rear differential 20d. The drive power transmitted to the rear differential 20d is distributed to respective drive shafts 21a, and the rear wheels 21b are driven by the drive shafts 21a.

The control device 30 has connected thereto a throttle opening degree, sensor S1, wheel speed sensors S2, a switch sensor for detecting the state of a 4WD switch and the like, and is provided with a MPU (microprocessor) and a drive circuit. The MPU is composed of a CPU and a memory storing control programs and data for controlling the electromagnetic clutch 20c, the second generator 20c and the like. The MPU takes thereinto detection signals output from the sensors S1-S3 through an interface thereby to judge the state in which the electromagnetic clutch 20c is to be operated, sets a voltage at which the second generator, 20e is to generate electric power, and outputs as command signals the states in which the electromagnetic clutch 20c and the second generator 20e are to be operated, to the drive circuit through the interface. The drive circuit responsive to the command signals from the MPU controls the ON (coupling)-OFF (uncoupling) of the electromagnetic clutch 20c, sets the voltage at which the second generator 20e is to generate electric power, and supplies the electric power of the set voltage to the electric motor 20a thereby to control the, driving of the electric motor 20a.

The control device 30 controls selecting the operational state for the, electric motor 20a when the 4WD switch is ON. The control device 30 judges the state in which the electric motor 20a is to be operated, based on the detection signals from the throttle opening degree sensor S1, the wheel speed sensors S2 and the switch sensor S3 for detecting the state of the 4WD switch. The result of such judgment is output to the drive circuit as a command signal. The drive circuit controls the operations of the electromagnetic clutch 20c and the second generator 20e in response to the command signal and controls the driving of the second generator 20e and the driving of the electric motor 20a.

Further, as shown in FIGS. 2 and 3, the secondary drive device 20 being the vehicle drive device according to the present invention is integrally provided with the electric motor 20a, the reduction gear train 20b, the electromagnetic clutch 20c and the rear differential 20d and is composed of these integral components and the second generator 20e for generation of high-voltage electric power.

The electric motor 20a and the rear differential 20d are connected through the reduction gear train 20b and the electromagnetic clutch 20c. When the electromagnetic clutch 20c is in the coupling state, the drive power of the electric motor 20a is transmitted to the rear differential 20d through the reduction gear train 20b and the electromagnetic clutch 20c. The electric motor 20a is driven upon receipt of the electric power from the second generator 20e to drive the rear wheels 21b and thus, brings the vehicle into the four-wheel drive state.

The rear differential 20d is known per se, is provided with pinions 22b and respective side gears 22c contained in a differential case 22a, and is rotatably supported with itself contained in an outer case 23a. The outer case 23a is one component constituting the reduction gear train 20b and has a ring gear 23b secured to the outer circumference thereof. The respective side gears 22c are in meshing with the pinion gears 22b, and respective drive shafts 21a are connected to the respective side gears 22c in such a way as to be able to transmit the drive power. Thee respective drive shafts 21a pass through as axle case 24 fluid-tightly and rotatably and protrude out of the axle case 24.

The reduction gear train 20b is composed of the large-diameter ring gear 23b secured to the outer circumference of the outer case 23a, a large-diameter first gear 23d and a small-diameter second gear 23e formed on an idler gear shaft 23c, and a small-diameter third gear 23f formed on an output shaft of the electric motor 20a. In the reduction gear train 20b, the first gear 23d on the idler gear shaft 23c is in meshing with the third gear 23f on the output shaft of the electric motor 20a, and the second gear 23e on the idler gear shaft 23c is meshing with the ring gear 23b on the outer case 23a. Thus, the reduction gear train 20b largely reduces the speed of the drive power output from the electric motor 20a before transmitting the drive power to the outer case 23a.

The secondary drive device 20 has a large feature in the construction of the electromagnetic clutch 20c as well as in the relationship in arrangement of the electromagnetic clutch 20c relative to the rear differential 20d.

More specifically, the electromagnetic clutch 20c is an electromagnetic clutch of the self-locking type and is provided with an annular outer member 25a, an electromagnetic coil 25b contained in a main body of the outer member 25a, an armature 25c located at the outside of the outer member 25a and attractable to be brought into friction engagement with the outside of the outer member 25a when electric current is applied to the electromagnetic coil 25b, an inner member 25d located coaxially of the outer member 25 at the inner side of the same, and a cam mechanism C arranged between the inner member 25d and the armature 25c for connecting both of these member 25c, 25d when operated.

In the electromagnetic clutch 20c of the aforementioned construction, the outer member 25a is securely screwed into one end opening portion of the outer case 23a. The inner member 25d is of a cylindrical shape which is integral with the differential case 22a and passes through an internal hole of the outer member 25a thereby to support the same, rotatably. The armature 25c is of an annular disc-like shape, is fit on the inner member 25d to be rotatable freely relative thereto and is located to face one side of the outer member 25a.

The cam mechanism C is of the construction that takes the armature 25c as first cam member and a flange portion (a part of the differential case 22a) of the inner member 25d as second cam-member, and that ball-like cam followers 26a are provided in plural cam grooves which are formed mutually facing surfaces of the armature 25c and the inner member 25d. The armature 25c which is the first cam member constituting the cam mechanism C is urged by means of a return spring 26b toward the cam followers 26a thereby to be spaced from one side surface of the outer member 25a. Thus, the electromagnetic clutch 20c is arranged to be compact at one side of the rear differential 20d.

In the electromagnetic clutch 20c, the magnetic force which is generated by applying electric current to the electromagnetic coil 25b attracts the armature 25c and brings the same into friction engagement with one side surface of the outer member 25a, whereby the outer member 25a and the inner member 25d are coupled with each other. In the cam mechanism C of the electromagnetic clutch 20c, the cam angle has been set properly, so that the axial force which is generated by the friction torque between the armature 25c and the one side surface of the outer member 25a is reduced to a friction torque owing to the rotational force of the inner member 25d, thereby to increase the friction torque.

Figure 4:
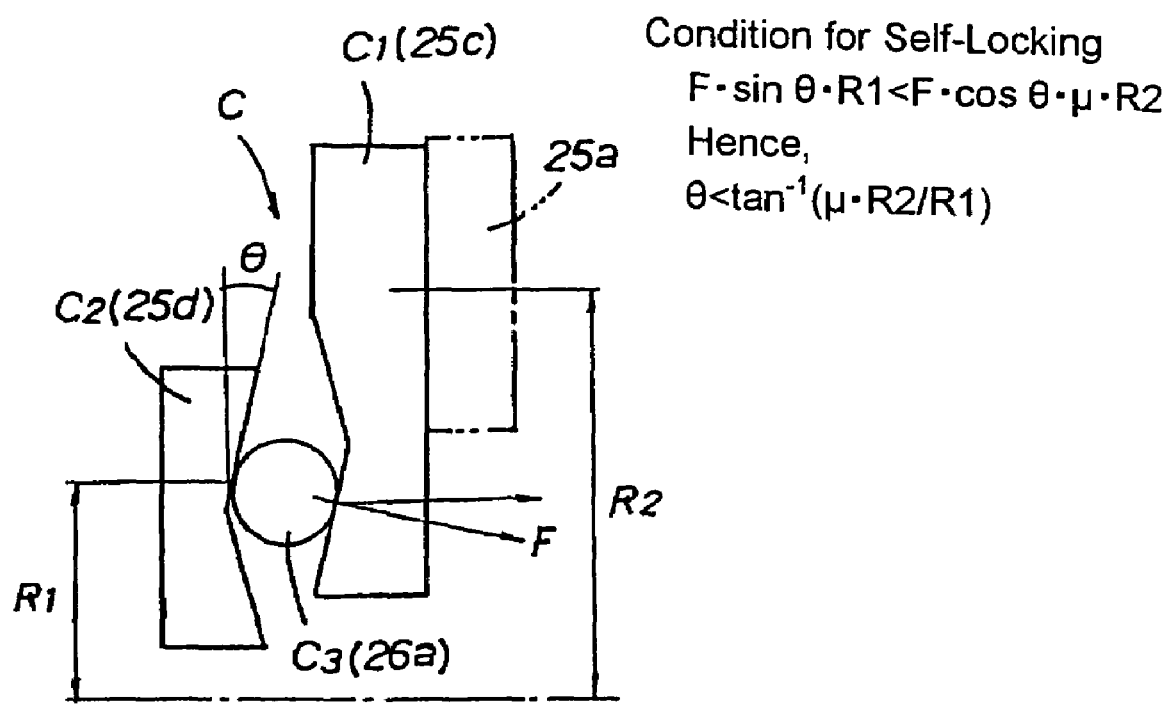
FIG. 4 is an explanatory view schematically showing a cam mechanism which constitutes the electromagnetic clutch.

The electromagnetic clutch 20c cyclically or periodically repeats the function to increase the friction torque. Thus, when the armature 25c is brought into friction engagement with one side surface of the outer member 25a by applying electric current to the electromagnetic coil 25b, the electromagnetic clutch 25a is brought by the rotational force of the inner member 25d into a locking state self-bindingly and instantaneously. In other words, the electromagnetic clutch 20c is self-locked by the rotational force of the inner member 25d. FIG. 4 represents the condition to construct the cam mechanism C so that the electromagnetic clutch 20 becomes to have the self-locking function.

It is to be noted that when the application of electric current to the electromagnetic coil 25b is discontinued with the electromagnetic clutch 20c being self-locked, the attraction force to the armature 25c is released, whereby the self-locking state can be released by the action of the return spring 26b. That is, the electromagnetic clutch 20c has the self-locking function and also has the self-locking release function.

FIG. 4 is a schematic view showing the cam mechanism C, and the cam mechanism C is composed of a first cam member C1 being the armature 25c, a second cam member C1 being the flange portion of the inner member 25d and cam followers C3 being the cam followers 26a. Where the cam radius is represented as R1, the effective radius of a friction surface facing the first cam member C1 is represented as R2, the cam angle of the cam grooves on the cam members C1, C2 is represented as θ, and the cam action force is represented as F, it is necessary to make the relation F·sin θ*R1<F·cos θ·μ·R2 hold true for self-locking, and therefore, the condition for self-locking is θ<tan$^{-1}$(μ·R2/R1). In the electromagnetic clutch 20c, the cam mechanism C is set to the construction condition thereby to be given the self-locking function.

In the secondary drive device 20 of the aforementioned construction, since the electromagnetic clutch 20c is arranged at one side of the rear differential 20d, the electromagnetic clutch 20c can be constituted to be small in the clutch diameter compared with that arranged at the outer circumference of the rear differential 20d, so that the secondary drive device 20 can be lightened and downsized. Accordingly, the secondary drive device 20 can be improved in the capability of being mounted on the vehicle, can simplify the suspension system of the vehicle, can be improved in fuel consumption and can become less expensive in price. Further, the dragging torque remaining at the time of torque disconnection can be made small since the electromagnetic clutch 20c is constructed to be small in the clutch diameter.

Further, in the secondary drive device 20, the electromagnetic clutch having the self-locking function is employed as the electromagnetic clutch 20c. If the transmission torque is taken as the criterion for judgment, the clutch with the self-locking function can be constructed to be downsized, lightened and less expensive compared with conventional clutches. Accordingly, and also owing to the construction that the electromagnetic clutch 20c is arranged at one side of the rear differential 20d, the secondary drive device 20 can be further improved in the capability of being mounted on the vehicle, can further simplify the suspension system of the vehicle, can be further improved in fuel consumption and can become lesser expensive in price.

In the foregoing embodiment, the vehicle drive device according to the present invention has been described in an example where it is applied to the secondary drive device 20 for driving the secondary drive wheels of the front-and-rear wheel drive vehicle. However, the vehicle drive device is applicable not only to a prime drive device for driving the prime drive wheels of the front-and-rear wheel drive vehicle, but also to a drive device for a two-wheel drive vehicle.

b) Second Embodiment

Figure 5:
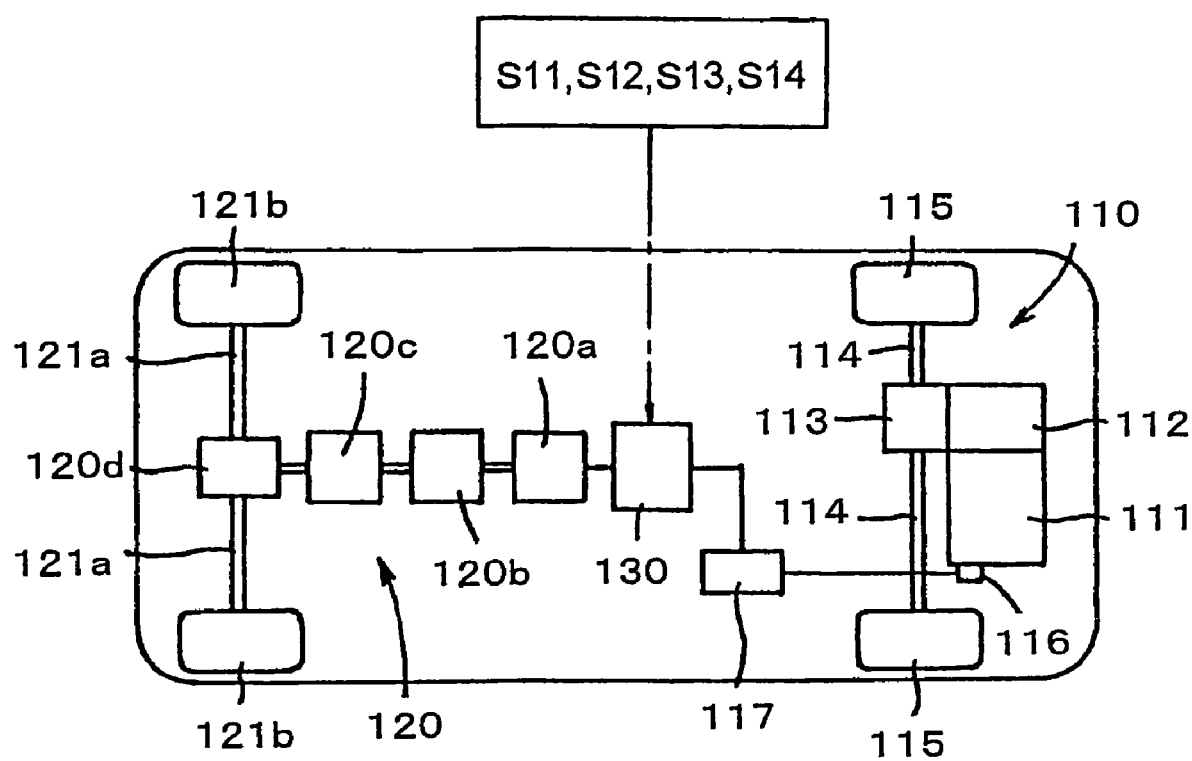
FIG. 5 is a schematic view showing the entire construction of a front-and-rear drive vehicle which incorporates as secondary drive device a vehicle drive device in a second embodiment according to the present invention.
Figure 6:
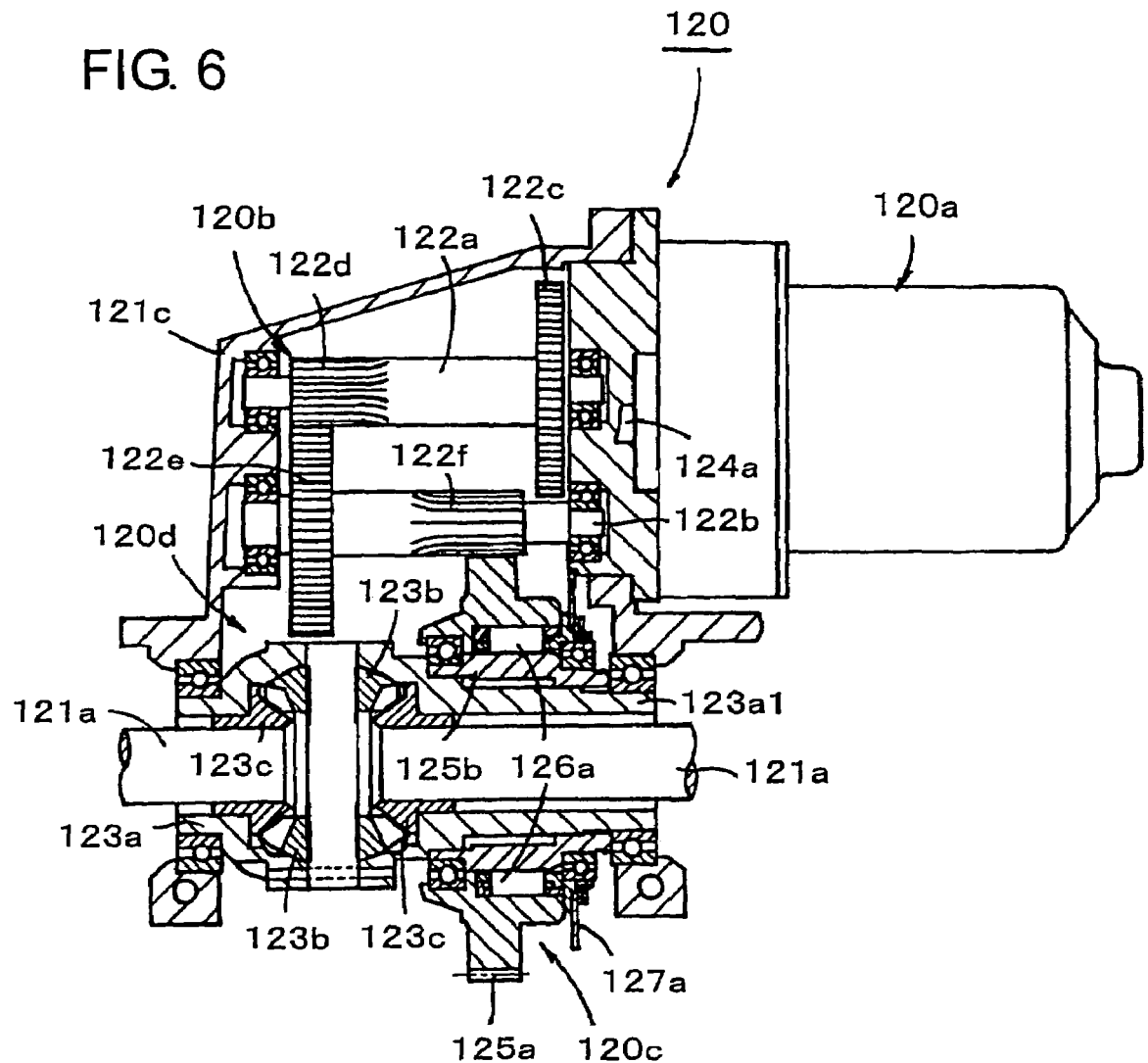
FIG. 6 is a horizontal plan view showing the secondary drive device.
Figure 8:
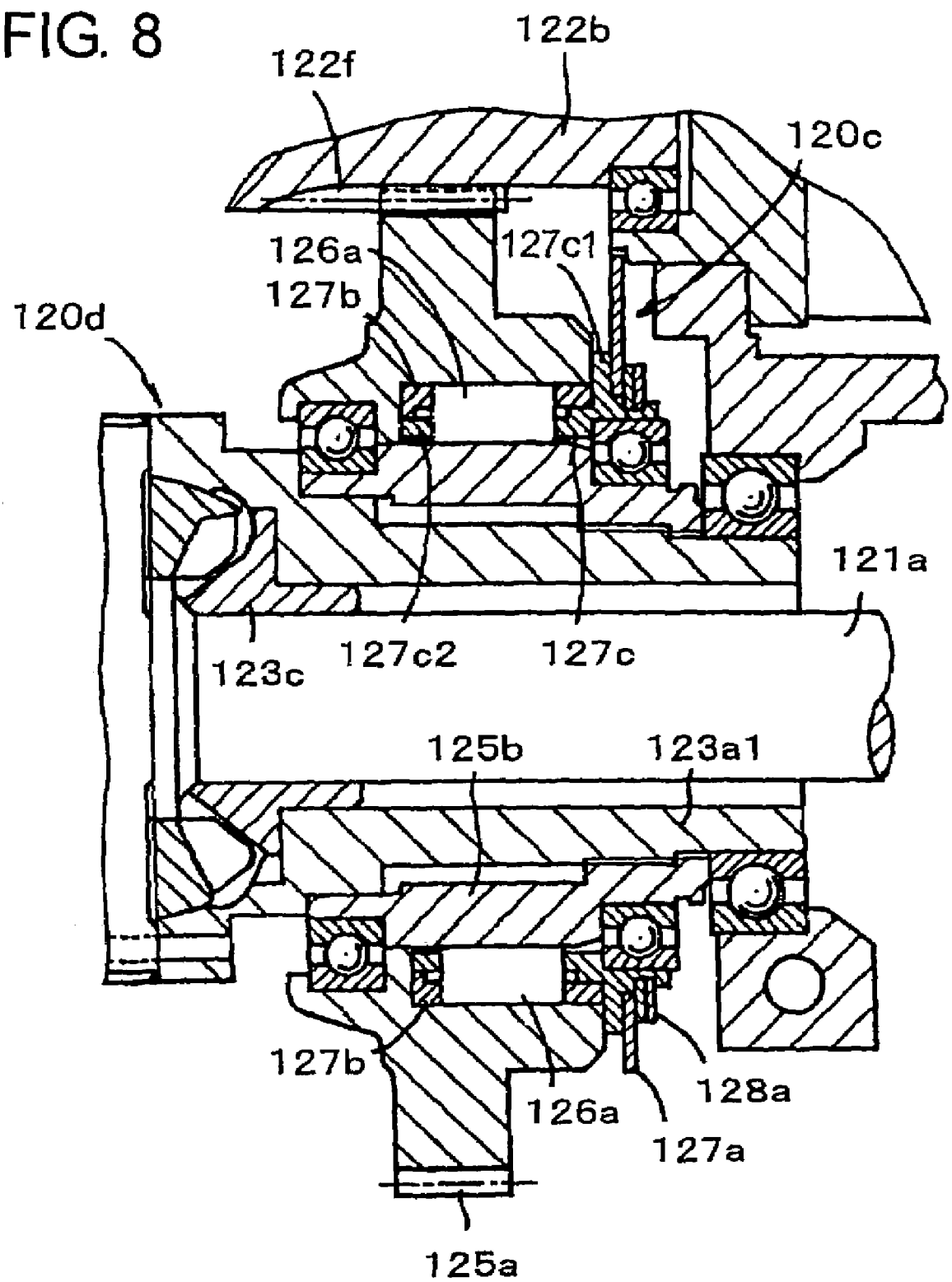
FIG. 8 is a horizontal plan view of a two-way clutch constituting the secondary drive device.
Figure 9:
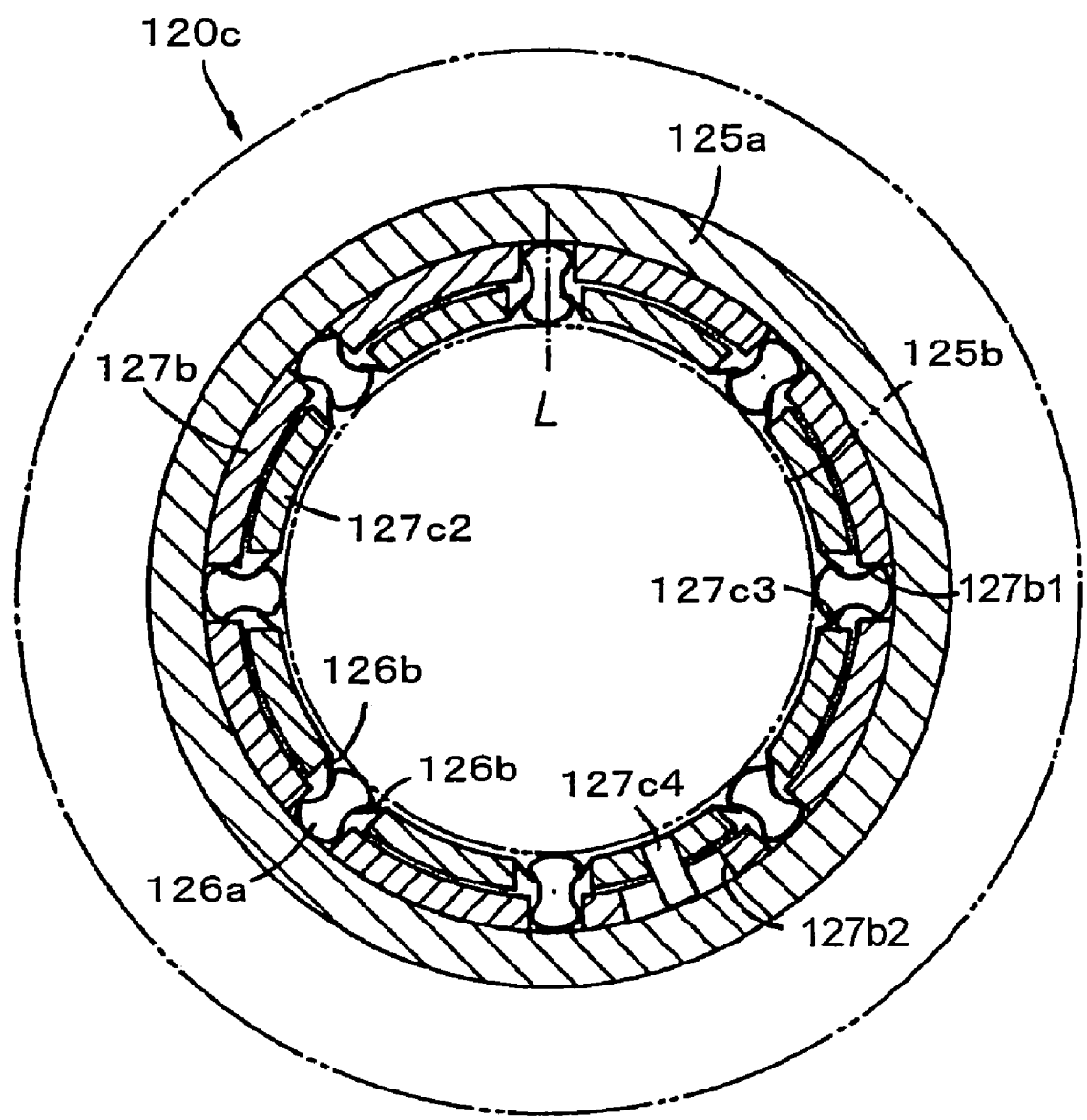
FIG. 9 is a cross-sectional view of the two-way clutch.

FIG. 5 shows a front-and-rear wheel drive vehicle incorporating a vehicle drive device in the second embodiment according to the present inventions. The front-and-rear wheel drive vehicle is provided with a prime drive device 110 for driving front wheels being prime drive wheels, secondary drive device 120 for driving rear wheels being secondary drive wheels, and a control device 130 for controlling the secondary drive device 120. Also; FIG. 6 shows the secondary drive device 120 constituting the front-and-rear wheel drive vehicle, and FIGS. 8 and 9 show a two-way clutch 120c constituting the secondary drive device 120.

The prime drive device 110 constituting the front-and-rear wheel drive vehicle is provided with an engine 111 being a combustion engine. In the prime drive device 110, the drive power from the engine 111 is distributed to respective drive shafts 114 through a transmission 112 and a front differential 113, and right and left front wheels 115 are driven by the respective drive shafts 114.

Further, the prime drive device 110 is provided with a generator 116 for generating electric power to drive an electric motor 120a which is drive means for the secondary drive device 120. The generator 116 is connected to a crankshaft of the engine 111 and is driven by the engine 111 to generate electric power. The electric power generated by the generator 111 is stored or accumulated in a battery 117, and when necessary, the electric power accumulated in the battery 117 is supplied to the electric motor 120a in response to a command signal from the control device 130, so that the electric motor 120a can be driven.

The secondary drive device 120 is provided with the electric motor 120a, a reduction gear train 120b, a two-way clutch 120c, and a rear differential 120d. In the secondary drive device 120, the electric motor 120a constitutes secondary drive means, and when necessary, the electric motor 120a is supplied with electric power from the battery 117 under the control signal from the control device 130 and is driven selectively in a positive or negative-going direction. When necessary, based on a command signal from the control device 130, the two-way clutch 120c is controlled to switch the coupling direction to the vehicle traveling direction in dependence on the positive-going driving or the negative-going driving of the electric motor 120a (i.e., the forward traveling or the reverse traveling of the vehicle).

The drive power of the electric motor 120a is transmitted to the rear differential 120d through the reduction gear train 120b and the two-way clutch 120c. The transmitted drive power is distributed by the rear differential 120d to respective drive shafts 121a, and the rear wheels 121b are driven by the respective drive shafts 121a.

The control device 130 has connected thereto a switch sensor S11 for detecting the manipulation state of a 4WD switch, a throttle opening degree sensor S12, wheels speed sensors S13, a shift position sensor S14 and the like, and is provided with a MPU (microprocessor) and a drive circuit. The MPU is composed of a CPU and a memory, and the memory has stored control programs and data for controlling the operation of the electric motor 120a. In the control device 130, the MPU takes thereinto detection signals output from the sensors S11-S14 through an interface and judges the state in which the secondary drive device 120 is to be operated, based on the detection signals taken thereinto. When it is judged that the secondary drive device 120 is to be operated, the MPU outputs a command signal for operating the electric motor 120a to the drive circuit through the interface. The drive circuit responsive to the command signal from the MPU supplies the electric power of a set voltage to the electric motor 120a. As a result, the secondary drive device 120 is operated to drive the rear wheels 121b and brings the vehicle into a front-and-rear wheel drive state.

Further, as shown in FIG. 6, the secondary drive device 120 is provided with the electric motor 120a as drive means, the reduction gear train 120b constituting drive power transmission means for connecting the electric motor 120a with the rear wheels 121b as driven means to be able to transmit drive power therebetween, the two-way clutch 120c, and the rear differential 120d. The reduction gear train 120b is provided with an input shaft 122a and an output shaft 122b which are rotatably supported in a mission case 121c in mutually parallel relation, a large-diameter first gear 122c and a small-diameter second gear 122d which are formed bodily on the input shaft 122a, and a large-diameter third gear 122e and a small-diameter fourth gear 122f which are formed bodily on the output shaft 122b.

Figure 7:
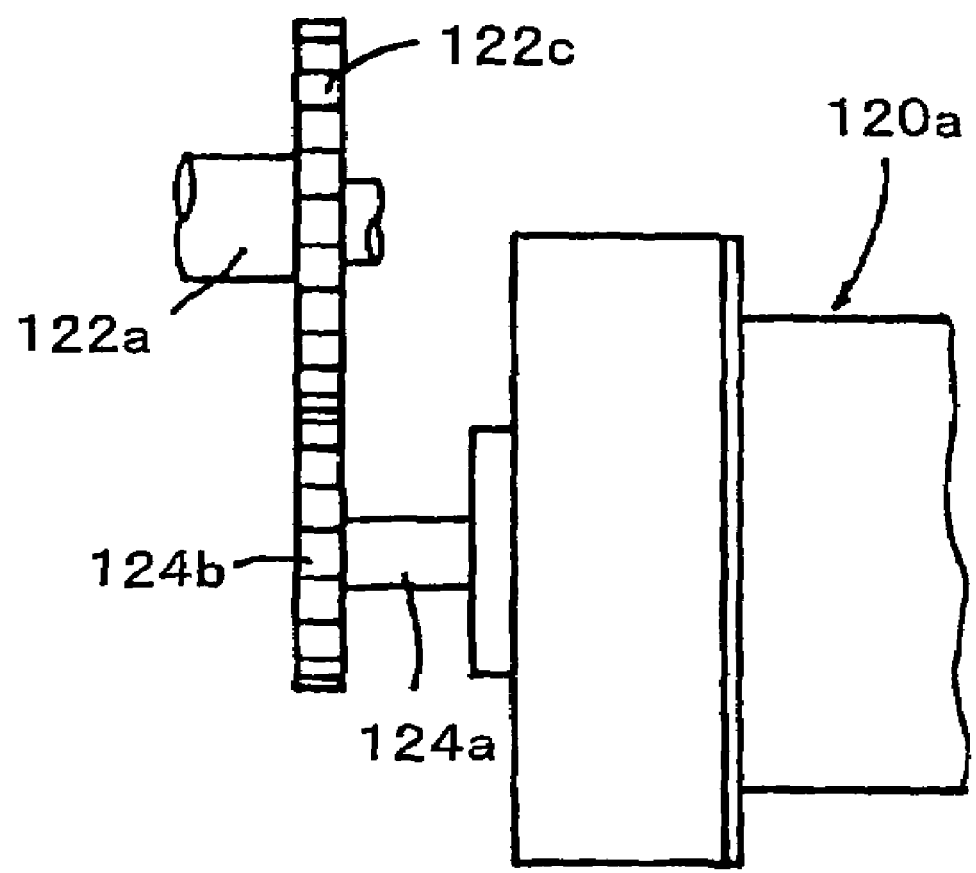
FIG. 7 is a plan view showing the connection portion between an electric motor and a reduction gear train which constitute the secondary drive device.

In the reduction gear train 120b, as shown in FIG. 7, the first gear 122c on the input shaft 122a is in meshing with an output gear 124b provided on an output shaft of the electric motor 120a arranged on the mission case 121c, the second gear 122d on the input shaft 122a is meshing with the third gear 122e on the output shaft 122b, and the fourth gear 122f on the output shaft 122b is in meshing with an input gear 125a of the two-way clutch 120c which will be described in more detail. In this state, the reduction gear train 120b keeps the electric motor 120a connected with the rear differential 120d by way of the two-way clutch 120c.

The rear difference 120d is known per se and is provided with a differential case 123a rotatably supported in the mission case 121c, a pair of pinions 123b contained in the differential case 123a, and a pair of side gears 123c meshing with the both pinions 123b. In the rear differential 120d, the two-way clutch 120c is assembled on a cylindrical mounting portion 123a1 provided on the differential case 123a, and the drive power output from the tow-way clutch 120c is transmitted to the differential case 123a. The drive power so input is distributed to the respective side gears 123c through the both pinions 123c, and is transmitted to the drive shafts 121a being connected with the respective side gears 123c. Thus, the both rear wheels 121b are driven, and the vehicle is brought into the front-and-rear wheel drive state.

The two-way clutch 120c is one known of a switching plate type and, as shown in FIGS. 8 and 9 in particular, is provided with the input gear 125a as input-side member, an inner ring 125b as output-side member, plural sprags 126a for making the coupling between the input gear 125a and the inner ring 125b intermittent, plural leaf springs 126b for sustaining these sprags 126a, a switching plate 127a, plural outer retainers 127b, and inner retainers 127c.

The inner ring 125b is of the cylindrical shape, is spline-fit on the outer circumference of the cylindrical mounting portion 123a1 of the differential case 123a and is connected to the differential case 123a to be rotatable bodily therewith. The input gear 125a is assembled to be rotatable on the outer circumference of the inner ring 125b and is in meshing with the fourth gear 122f on the output shaft 122b of the reduction gear train 120b. In the assembled state, an annular space is formed between the inner circumference of the input gear 125a and the outer circumference of the inner ring 125b and contains the inner retainers 127c arranged to be rotatable around the inner ring 125b, the plural outer retainers 127b provided bodily on the inner circumference of the input gear 125a, the plural sprags 126a and the leaf springs 126b.

Each outer retainer 127b is of arc shape with a predetermined length which fits on the inner circumference of the input gear 125a, and an arc recess 127b1 of a predetermined length is formed between every adjoining two of the outer retainers 127b which are arranged circumferentially at regular intervals. Each outer retainer 127b constitutes an outside retainer. The inner retainer 127c is composed of an outward annular flange portion 127c1 and plural segmental pieces 127c2 which are bodily provided on the inner circumferential side thereof, and the segmental pieces 127c2 are coaxially arranged at regular intervals in the circumferential direction. The dimension of each segmental piece 127c2 in the arc direction is formed to be shorter than that of each outer retainer 127b in the arc direction, and an arc recess 127c3 of a predetermined length is formed between every adjoining two of the segmental pieces 127c2. The dimension of each arc recess 127c3 in the arc direction is made to be longer than the dimension of the arc recess 127b1 which each outer retainer 127b forms in the arc direction, and a restraining pin 127c4 embedded in a particular segmental piece 127c2 is inserted into an elongate hole 127b2 which is formed in a particular outer retainer 127b to extend in the circumferential direction. Each segmental piece 127c2 of the inner retainer 127c constitutes an inside retainer.

The inner retainer 127c extends the outward annular flange portion 127c1 outside of the annular space portion with each segmental piece 127c2 retained on the inner circumference of the corresponding outer retainer 127b, and in this assembled state, the outer circumference of the inner ring 125b is rotatable in the circumferential direction. The sprags 126a and the plural leaf springs sustaining the sprags 126a are respectively located between the arc recesses 127c3 formed by the segmental pieces 127c2 of the inner retainer 127c and the arc recesses 127b1 formed by the outer retainers 127b.

Figures 11A, 11B:
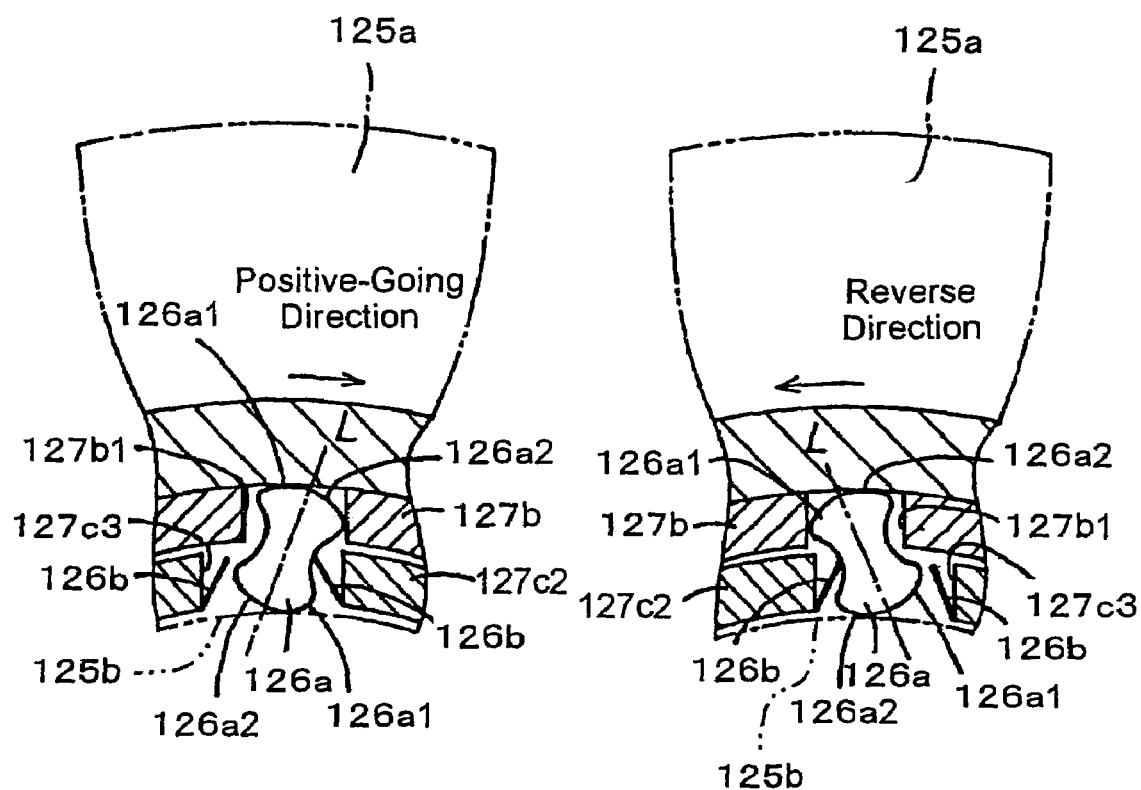
FIGS. 11(a) and 11(b) are fragmentary cross-sectional views (a) and (b) which respectively show the states in coupling operation of the two-way clutch in positive-going and reverse directions.

As shown in FIGS. 9 and 11, each sprag 126a is a rod the cross-section of which gradually sags toward the radial center portion, and a positive-going side cam surface 126a1 and a reverse side cam surface 126a2 are formed at arc surfaces which are formed at the top side and the bottom side, respectively. Each sprag 126a is sustained by a pair of right and left leaf springs 126b from the right and left in the circumferential direction and is held at a neutral area where the center line L of the sprag 126a coincides with the radial direction of the input gear 125a.

Figure 10:
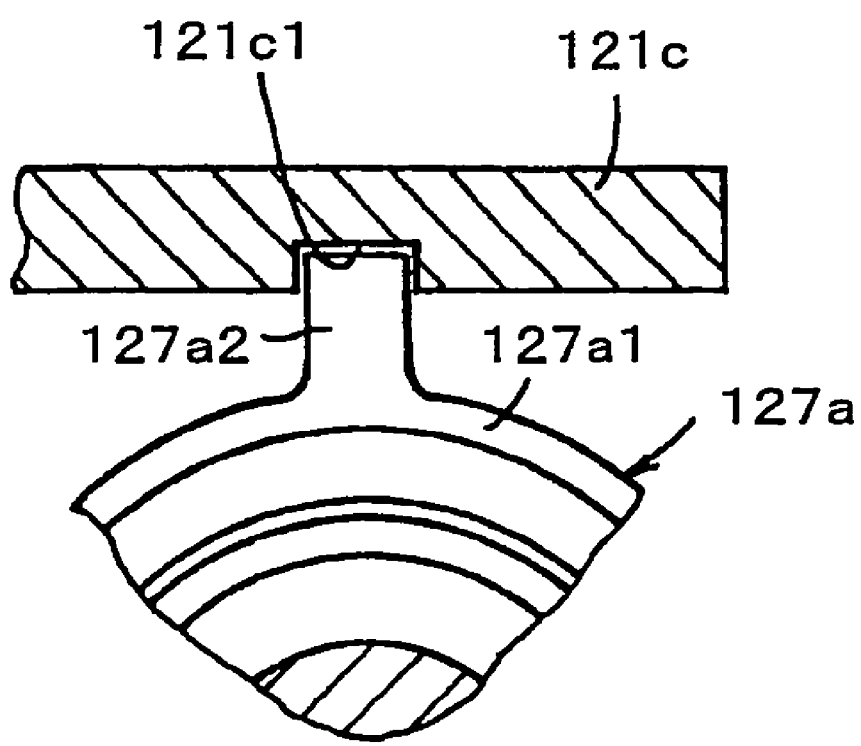
FIG. 10 is a cross-sectional view showing the connection portion of a switching plate, constituting the two-way clutch relative, to a mission case.

The switching plate 127a is assembled to a boss portion of the inner retainer 127c held in this assembled state with a resilient member 128a interposed therebetween. As shown in FIG. 10, the switching plate 127a is of the type provided with a protruding piece 127a2 ion an outer circumferential edge portion of a ring-like plate body 127a1, and is prevented by the mission case 121c from rotating, with the protruding piece 127a2 engaged with an engaging recess 121c1 provided on the mission case 121c. Further, the plate body 127a1 of the switching plate 127a is urged by the resilient force of the resilient member 128a to be pressured on the outside surface of the outward flange portion 127c1 of the inner retainer 127c. With this construction, the switching plate 127a permits the relative rotation between the input gear 125a and the inner retainer 127c. The amount of the relative rotation in the positive-going and reverse directions is limited to a predetermined amount by means of the restraining pin 127c4 which is on the segmental piece 127c2 to be inserted in the elongate hole 127b2 of the outer retainer 127b.

In the two-way clutch of the aforementioned construction, when the electric motor 120a driven in the positive-going direction (i.e., vehicle forward traveling direction) causes the input gear 125a to be rotated in the positive-going direction, relative rotation of a predetermined amount is generated between the outer retainer 127b and the inner retainer 127c. This causes the sprags 126a to turn in a clockwise direction as viewed in FIG. 11(a), whereby both of the positive-going side came surfaces 126a1 of each sprag 126a are forced to bite at the input gear 125a and the inner ring 125b. Thus, the two-way clutch 120c is coupled in the positive-going direction (i.e., vehicle forward traveling direction) and transmits the drive power from the electric motor 120a to the rear differential 120d. The transmitted drive power is distributed by the rear differential 120d to respective drive shafts 121a, so that the vehicle is brought into the forward traveling state of the front and rear wheel drives.

Also in the two-way clutch 120c of the aforementioned construction, when the electric motor 120a driven in the reverse direction (i.e., vehicle reverse traveling direction) causes the input gear 125a to be rotated in the reverse direction, relative rotation of the predetermined amount is generated between the outer retainer 127b and the inner retainer 127c. This causes the sprags 126a to turn in a counterclockwise direction as viewed in FIG. 11(b), whereby both of the reverse rotation side came surfaces 126a2 of each sprag 126a are forced to bite at the input gear 125a and the inner ring 125b. Thus, the two-way clutch 120c is coupled in the reverse rotation direction (i.e., vehicle reverse traveling direction) and transmits the drive power from the electric motor 120a to the rear differential 120d. The transmitted drive power is distributed by the rear differential 120d to respective drive shafts 121a, so that the vehicle is brought into the reverse traveling state of the front and rear wheel drives.

The front-and-rear wheel drive vehicle can be brought into a two-wheel drive traveling state of the front wheel drive by starting the engine 111 constituting the prime drive device 110 and can also be brought into a four-wheel drive traveling state of the front and rear wheel drives when the control device 130 controls the operation of the secondary drive device 120 upon the manipulation of the 4WD switch to ON.

For control of the secondary drive device 120, the control device 130 takes thereinto through the interface the detection signals output from the switch sensor S11 for detecting the manipulation state of the 4WD switch, the throttle opening degree sensor S12, the wheel speed sensors S13 and the shift position sensor S14. The MPU judges the state in which the secondary drive device 120 is tog be operated, based on the various detection signals taken thereinto and when judging that the secondary drive device 120 is to be operated, outputs a command, signal to operate the electric motor 120a, to the drive circuit through the interface. The drive circuit supplies electric power of a set voltage to the electric motor 120a based on the command signal from the MPU. The control device 130 executes a program for drive control of the secondary drive device 120 in accordance with the flowchart shown in FIG. 12.

The control device 130 starts its operation at the time of the engine 111 starting, and the microcomputer constituting the control device 130 judges the ON-OFF state of the 4WD switch at step 202 and when judging that the 4WD switch is in OFF-state, advances the program to step 204 to hold the electric motor 120a in the non-driving state before terminating the execution of the program. Further, the microcomputer advances the program to step 206 when judging at step 202 that the 4WD switch is in ON-state.

The microcomputer reads the throttle opening degree, the wheels speeds and the shift position at step 206 and judges at step 208 whether or not the time is the state in which the secondary drive device 120 is to be drivingly controlled. When judging at step 208 that the time is not the state in which the secondary drive device 120 is not to be drivingly controlled, the microcomputer returns the program to step 204 to hold the electric motor 120a in non-operation state before terminating the execution of the program. Further, when judging at step 208 that the time is the state in which the secondary drive device 120 is to be drivingly controlled, the microcomputer advances the program to step 210, at which the microcomputer executes the judgment concerning the traveling direction of the vehicle.

When judging at step 210 that the vehicle traveling direction is the forward direction, the microcomputer advices the program to step 212 to rotationally drive the electric motor 120a in the positive-going direction. Thus, the vehicle is brought into the forward traveling state of the front and rear dual wheel drives. Further, when judging at step 210 that the vehicle traveling direction is the reverse direction, the microcomputer advances the program to step 214 to rotationally drive the electric motor 120a in the reverse direction. Thus, the vehicle is brought into the reverse traveling state of the front and rear dual wheel drives.

The control device 130 is provided with the foregoing basic drive control program for the secondary drive device 120 and is also provided with coupling control programs for controlling the coupling direction of the two-way clutch 120c so as to execute the coupling control programs at the time of the shift position switched and in dependence upon the traveling condition of the vehicle. Of the coupling control programs, a first coupling control program is executed in accordance with the flowcharts shown in FIGS. 13 and 14, a second coupling control program is executed in accordance with the flowchart shown in FIG. 15, and a third coupling control program is executed in accordance with the flowchart shown in FIG. 16.

The first coupling control program is composed of a program for being operated at the time of the engine 111 starting and for driving the electric motor 120a to switch the two-way clutch 120c when the shift position is switched from the forward direction traveling side to the reverse direction traveling side or from the reverse direction traveling side to the forward direction traveling side, and another program for driving the electric motor 120a to switch the two-way clutch 120c when the vehicle speed is increased from under a predetermined speed to over the predetermined speed. The former program of the first coupling control program is executed in accordance with the flowchart shown in FIG. 13, while the latter program of the first coupling control program is executed in accordance with the flowchart shown in FIG. 14.

Figure 13:
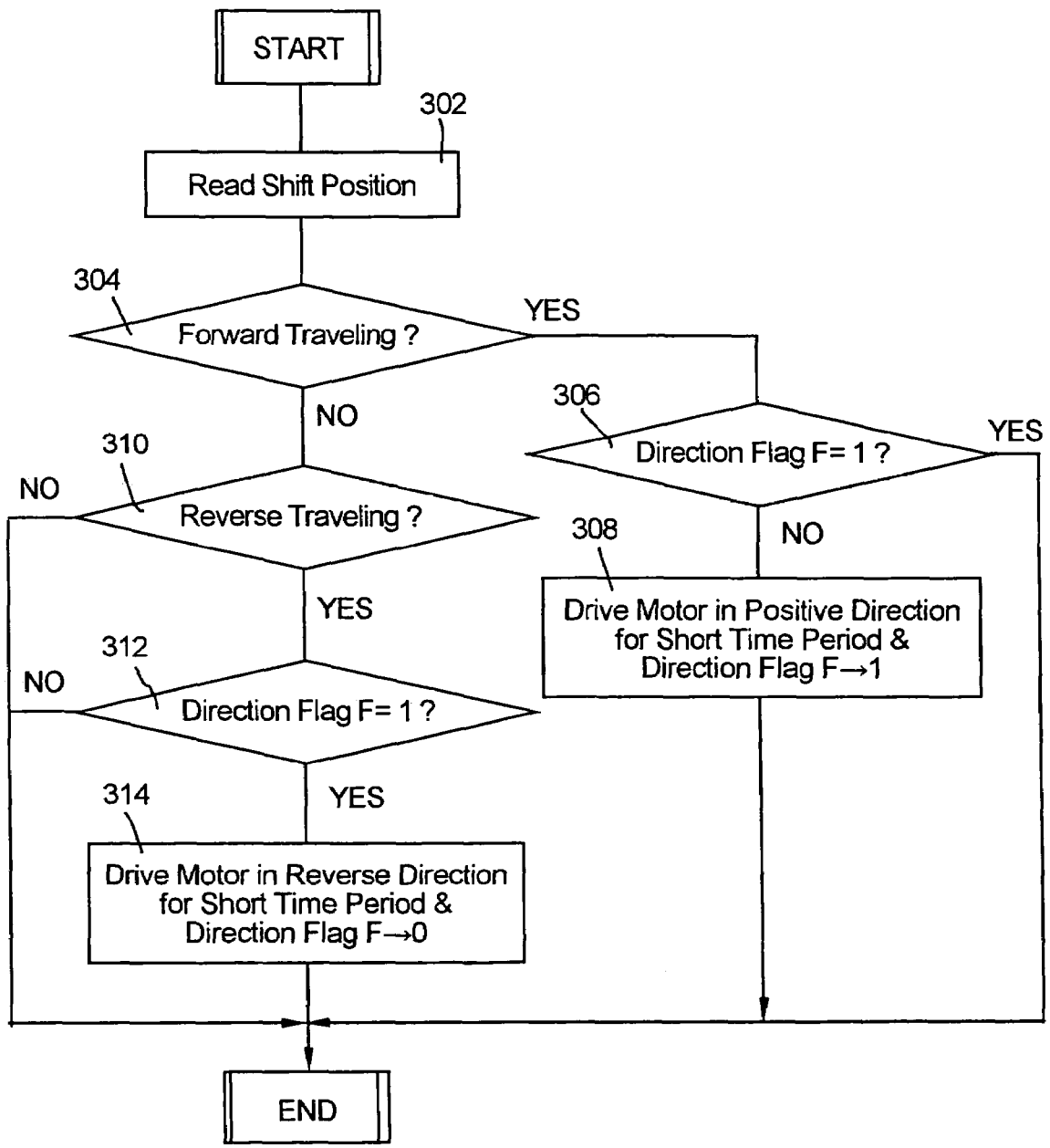
FIG. 13 is a flowchart for executing a basic program of a first coupling control program which control the coupling state of the two-way clutch.

The microcomputer constituting the control device 130 is started to operate at the time of the engine 111 starting and executes the former program of the first coupling control program in accordance with the flowchart shown in FIG. 13 to read the shift position at step S302 and to judge the state of the vehicle traveling direction being selected at step 304. When judging at step 304 that the vehicle traveling direction is selected to the forward traveling direction, the microcomputer judges the state of a direction flag F at step 306. The direction flag F is to indicate the coupling direction of the two-way clutch 120c. The initial value is "0", and the direction flag F=1 indicates that the coupling direction of the two-way clutch 120c is set for the vehicle forward traveling direction, while the direction flag F=0 indicates that the coupling direction of the two-way clutch 120c is set for the vehicle reverse traveling direction.

The microcomputer terminates the execution of the program when judging at step 306 that the direction flag F is "1". Also, the microcomputer advances the program to step 308 when judging at step 306 that the direction flag F is "0". At step 308, the microcomputer rotationally drive the electric motor 120a in the positive-going direction for a predetermined time period and sets the direction flag to "1" prior to terminating the execution of the program.

When judging at step 304 that the vehicle traveling direction has not been selected to the forward traveling direction, the microcomputer judges at step 310 whether or not the vehicle traveling direction has been selected to the reverse traveling direction. The microcomputer terminates the execution of the program when judging at step 310 that the vehicle traveling direction has not been selected to the reverse traveling direction, but advances the program to step 312 when judging that the vehicle traveling direction has been selected to the reverse traveling direction. The microcomputer terminates the execution of the program when judging at step 312 that the direction flag F is "0".

When judging at step 312 that the direction flag F is "1", the microcomputer advances the program to step 314, at which it reversely rotates the electric motor 120a for a predetermined time period to set the coupling direction of the two-way clutch 120c to the vehicle reverse traveling direction and clears the direction flag F to "0" then to terminate the execution of the program.

Figure 14:
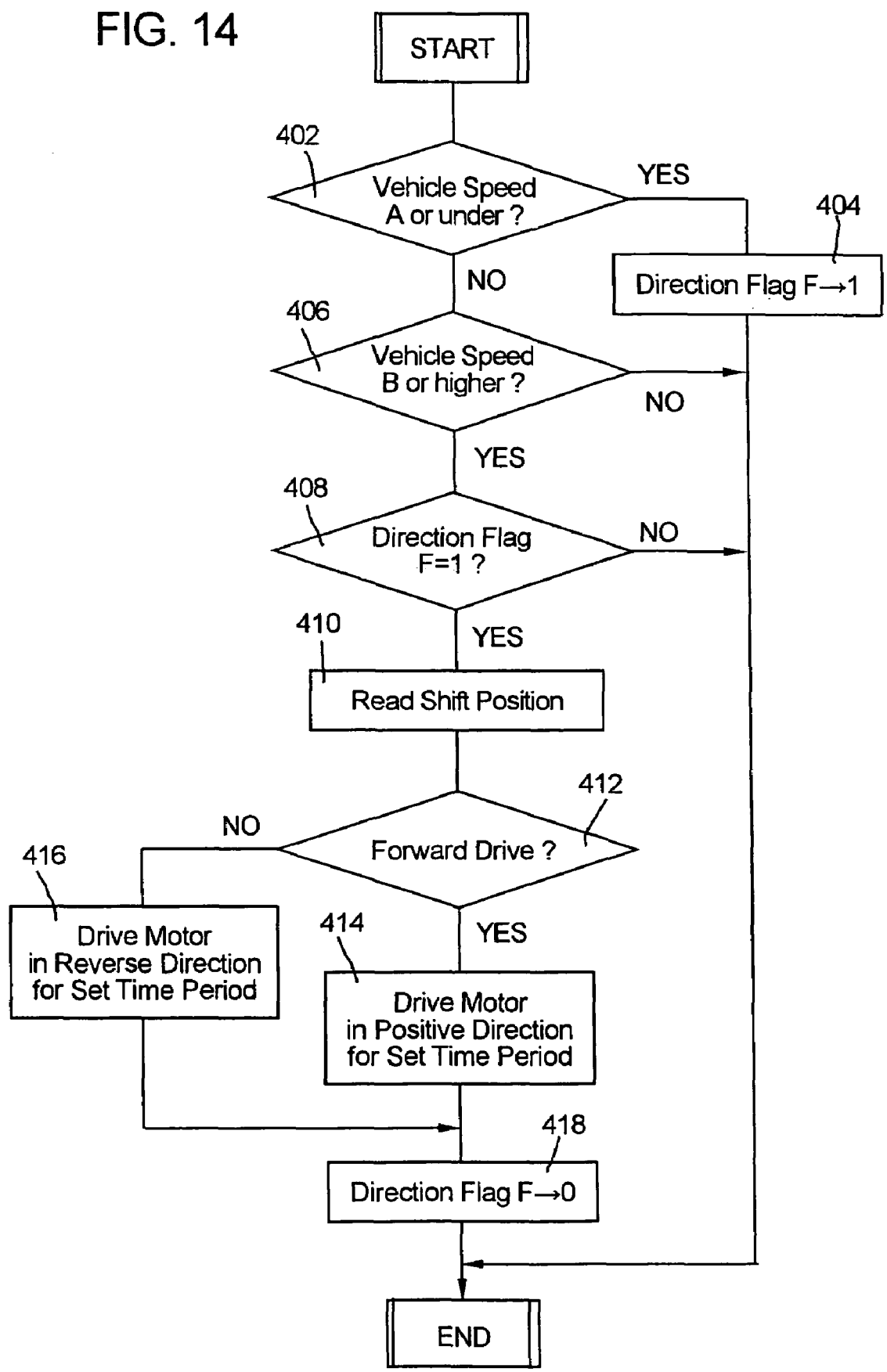
FIG. 14 is a flowchart for executing a subordinate program of the first coupling control program.

The latter program of the first coupling control program is executed in accordance with the flowchart shown in FIG. 14. When the vehicle speed is increased from under the predetermined speed to over the predetermined speed, the microcomputer constituting the control device 130 is to drive the electric motor 120a in the vehicle traveling direction for the predetermined time period so that the coupling direction of the two-way clutch 120c is made coincide with the vehicle traveling direction.

The microcomputer makes the judgment of the vehicle speed at step 402 and when judging that the vehicle speed is A (e.g., 1 km/h) or under, sets the direction flag F to "1" at step 404 prior to terminating the execution of the control program. Further, when judging at step 402 that the vehicle speed is higher than A, the microcomputer advances the program to step 406 to make judgment of the vehicle speed again.

The microcomputer terminates the execution of the program when judging at step 406 that the vehicle speed is lower that B (e.g., 20 km/h) which is higher by a predetermined speed than A. Further, when judging at step 406 that the vehicle speed is B or higher which is higher by the predetermined speed than A, the microcomputer advances the program to step 408 to judge at step 408 whether or not the direction flag F is "1". The microcomputer terminates the execution of the control program when judging at step 408 that the flag F is not "1", while it advances the program to step 410 when judging the flag to be F=1.

The microcomputer reads the shift position at step 410 and judges the vehicle traveling direction at step 412. When judging at step 412 that the vehicle traveling direction is the forward traveling direction, the microcomputer at step 414 rotationally drives the electric motor 120a in the positive-going direction for the predetermined time period to make the coupling direction of the two-way clutch 120c coincide with the vehicle traveling direction. And, when judging that the vehicle traveling direction is the reverse direction, the microcomputer at step 416 rotationally drives the electric motor 120a in the reverse direction for the predetermined time period to make the coupling direction of the two-way clutch 120c coincide with the vehicle traveling direction. Thereafter, the microcomputer advances the program to step 418, at which it clears the direction flag F (i.e., direction flag F=0) and then terminates the execution of the control program.

According, to the foregoing first control program, even where the vehicle traveling direction is indistinct only from the shift position in a low speed range like the time of a slope starting the coupling direction of the two-way clutch 120 is switched again when the vehicle speed change from the low speed to a medium speed makes it possible to reliably judge that the vehicle is traveling in the same direction as indicated by the shift position, whereby it becomes realized that the switching state of the coupling direction of the two-way clutch 120c can be held in an exact state before the vehicle speeds further increases.

Figure 15:
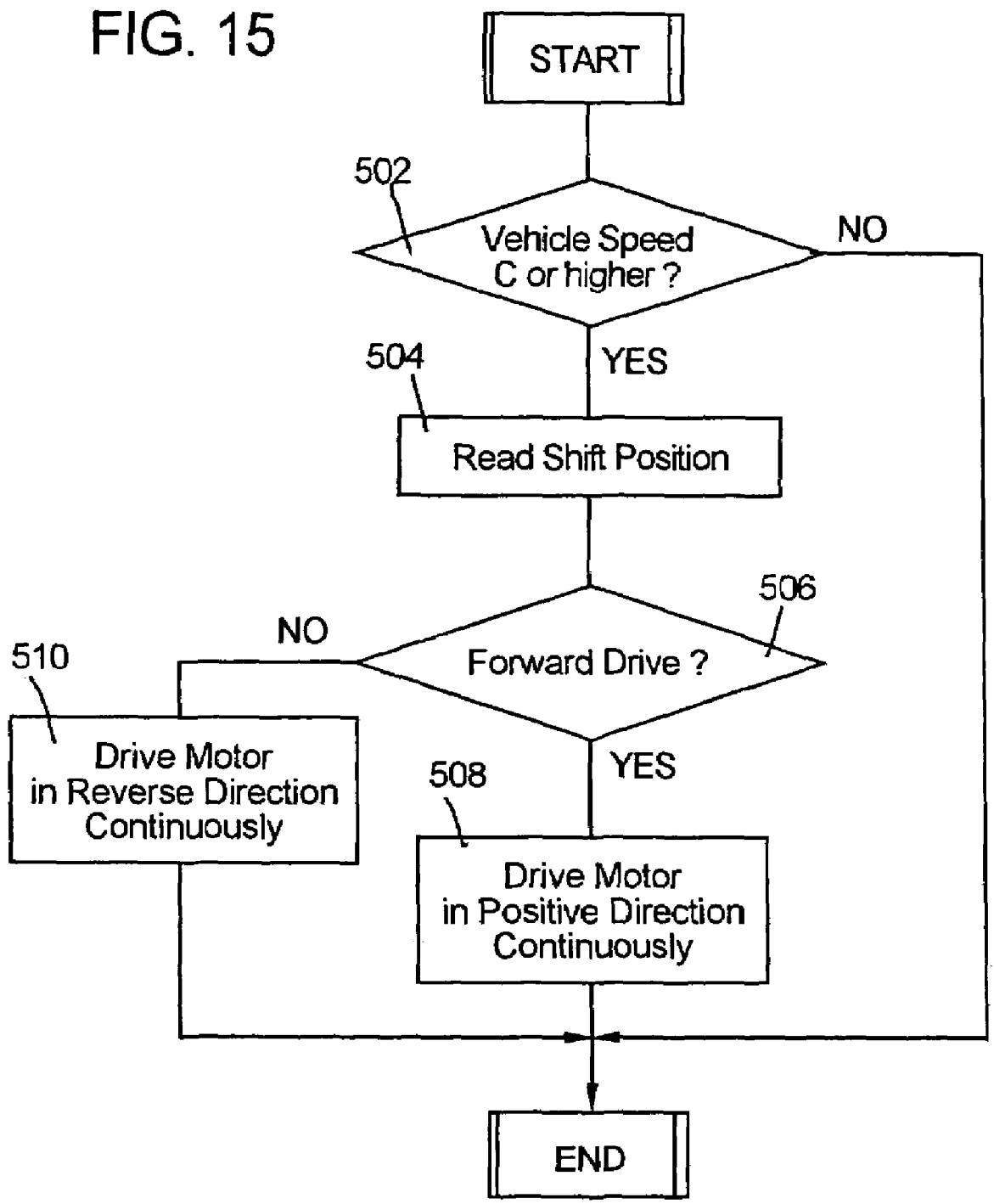
FIG. 15 is a flowchart for executing a second coupling control program which control the coupling state of the two-way clutch.
Figure 16:
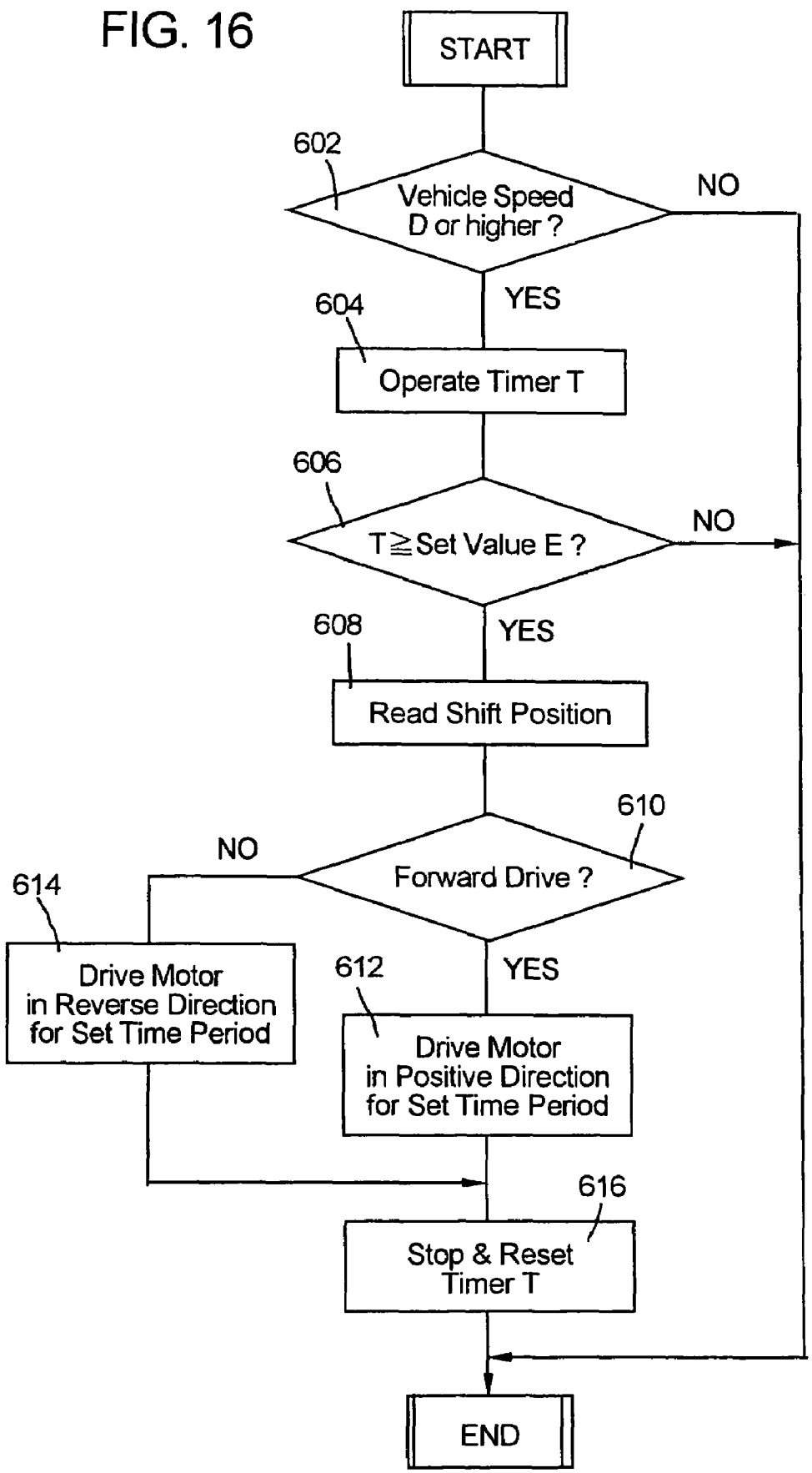
FIG. 16 is a flowchart for executing a third coupling control program which control the coupling state of the two-way clutch.

The second coupling control program is to make the coupling direction of the two-way clutch 120c coincide with the vehicle traveling direction by driving the electric motor 120a continuously when the vehicle speed becomes a predetermined speed or higher and then to hold that state, and the microcomputer executes the control program in accordance with the flowchart shown FIG. 15.

The microcomputer judges the vehicle speed at step 502 and terminates the execution of the control program when judging that the vehicle speed is lower than C (e.g., 50 km/h). When judging that the vehicle speed is C or higher, the microcomputer reads the shift position at step 504 and judges the vehicle traveling direction at step 506.

When judging at step 506 that the vehicle is forward traveling, the microcomputer continuously drives the electric motor 120a in the positive-going direction at step 508 thereby to make the coupling direction of the two-way clutch 120c coincide with the vehicle traveling direction and then to hold that state. When judging that the vehicle is reverse traveling, on the contrary, the microcomputer continuously drives the electric motor 120a in the reverse direction at step 510 thereby to make the coupling direction of the two-way clutch 120c coincide with the vehicle traveling direction and then to hold that state. The microcomputer thereafter terminates the execution of the control program.

According to the second coupling control program, it can be prevented that the coupling direction of the two-way clutch 120c is caused by something like vibrations during a high speed traveling to be changed from the vehicle traveling direction to the direction opposite thereto.

The third coupling control program is to make the coupling direction of the two-way clutch 120c coincide with the vehicle traveling direction by driving the electric motor 120a cyclically or periodically when the vehicle speed is increased to a predetermined speed or higher and then to hold that state. The microcomputer executes the control program in accordance with the flowchart shown FIG. 16.

The microcomputer judges the vehicle speed at step 602 and terminates the execution of the control program when judging that the vehicle speed is lower than D (e.g., 50 km/h). When judging that the vehicle speed is D or higher the microcomputer operates a timer T at step 604 and judges at sep 606 whether or not the vehicle speed D or higher has continued for a predetermined time period E (e.g., 60 seconds). The microcomputer terminates the execution of the control program when judging that the vehicle speed D or higher has not continued for the predetermined time period E. When judging that the vehicle speed D or higher has continued for the predetermined time period E, the microcomputer reads the shift position at step 608 and judges the vehicle traveling direction at step 610.

When judging at step 610 that the vehicle traveling direction is forward traveling, the microcomputer rotationally drives the electric motor 120a in the positive-going direction for a predetermined time period at step 612 thereby to make the coupling direction of the two-way clutch 120c coincide with the vehicle traveling direction. When judging that the vehicle traveling direction is reverse traveling, on the contrary, the microcomputer rotationally, drives the electric motor 120a in the reverse direction for the predetermined time period at step 614 thereby to make the coupling direction of the two-way clutch 120f coincide with the vehicle traveling direction. Then, the microcomputer advances the program to step 616 at which it stops and resets the timer T before terminating the execution of the control program.

According to the third coupling control program, it can be prevented that the coupling direction of the two-way clutch 120c is caused by something like vibrations during a high speed traveling to be changed from the vehicle traveling direction to the direction opposite thereto, and the electric power for operating the electric motor 120a can be reduced owing to the intermittent operation.

In the front-and-rear drive vehicle, it is possible to execute these coupling control programs for the two-way clutch 120c not only during the two-wheel drive traveling of the front wheel single drive but also during the four-wheel drive traveling of the front and rear dual wheel drives. Therefore, during the two-wheel drive traveling of the front wheel single drive and during the four-wheel drive traveling of the front and rear dual wheel drives, it becomes possible to make the coupling direction of the two-way clutch 120c coincide with the vehicle traveling direction, to restrain the dragging torque from being generated in the two-way clutch 120c during the vehicle traveling, to prevent the energy loss caused by the dragging torque, to prevent the two-way clutch 120c from being brought into the coupling state by the cause of the dragging torque, to prevent the energy loss caused thereby and to prevent the drive torque from being transmitted thereby from the rear wheels 121b side to the electric motor 120a side.

INDUSTRIAL APPLICABILITY

As describe hereinabove, the vehicle drive device according to the present invention is useful as one which drives secondary drive wheels (front wheels or rear wheels) and in particular, is suitable for use in front-and-rear wheel drive vehicles which are required to be downsized and lightened.

The invention claimed is:

1. A vehicle drive device for distributing the drive power from secondary drive means to right and left drive wheels through drive shafts extending in an axial direction from a differential gear, wherein the drive device uses a clutch to make intermittent the drive power transmission from the secondary drive means to the differential gear, wherein the clutch is arranged coaxially of the differential gear and is axially located at one side relative to the differential gear.

2. The vehicle drive device as set forth in claim 1, wherein the clutch is an electromagnetic clutch of self-locking type and is composed of an annular outer member, an electromagnetic coil contained in a body of the outer member, an armature arranged outside of the outer member and frictionally engageable with the outer side of the outer member by being attracted when electric current is applied to the electromagnetic coil, an inner member located inside of the inner circumference of the outer member coaxially of the same, and a cam mechanism located between the inner member and the armature for coupling these members with each other when operated, wherein the outer member is connected to a transmission member for the drive power output from the electric motor, wherein the inner member is connected to a differential case which is a component of the differential gear, and wherein the cam mechanism makes a first cam member with the armature and a second cam member with a part of the differential case and is constituted by interposing cam followers between the both cam members.

3. The vehicle drive device as set forth in claim 1, wherein the vehicle drive device constitutes a front-and-rear drive vehicle provided with prime drive means for driving prime drive wheels and the secondary drive means for driving secondary drive wheels and wherein the vehicle drive device is utilized as the prime drive means or the secondary drive means.

4. A vehicle drive device for distributing the drive power from secondary drive means to right and left drive wheels through drive shafts extending in an axial direction from a differential gear, wherein the drive device uses a clutch to make intermittent the drive power transmission from the secondary drive means to the differential gear, wherein the clutch has a self-locking function and is arranged coaxially of the differential gear and is axially located at one side relative to the differential gear.

5. The vehicle drive device as set forth in claim 4, wherein the clutch is an electromagnetic clutch of self-locking type and is composed of an annular outer member, an electromagnetic coil contained in a body of the outer member, an armature arranged outside of the outer member and frictionally engageable with the outer side of the outer member by being attracted when electric current is applied to the electromagnetic coil, an inner member located inside of the inner circumference of the outer member coaxially of the same, and a cam mechanism located between the inner member and the armature for coupling these members with each other when operated, wherein the outer member is connected to a transmission member for the drive power output from the electric motor, wherein the inner member is connected to a differential case which is a component of the differential gear, and wherein the cam mechanism makes a first cam member with the armature and a second cam member with a part of the differential case and is constituted by interposing cam followers between the both cam members.

6. The vehicle drive device as set forth in claim 4, wherein the vehicle drive device constitutes a front-and-rear drive vehicle provided with prime drive means for driving prime drive wheels and the secondary drive means for driving secondary drive wheels and wherein the vehicle drive device is utilized as the prime drive means or the secondary drive means.

7. A vehicle drive device for distributing the drive power from secondary drive means to right and left drive wheels through drive shafts extending in an axial direction from a differential gear, wherein the drive device uses a clutch to make intermittent the drive power transmission from the secondary drive means to the differential gear, wherein the clutch is arranged coaxially of the differential gear and is axially located at one side relative to the differential gear and is constituted by a two-way clutch.

8. The vehicle drive device as set forth in claim 7, wherein the clutch is controlled into the coupling state for the vehicle traveling direction by driving the secondary drive means in the vehicle traveling direction.

9. A vehicle drive device for distributing the drive power from secondary drive means to right and left drive wheels through a differential gear wherein the drive device uses a clutch to make intermittent the drive power transmission from the secondary drive means to the differential gear, wherein the clutch has a self-locking function, wherein the clutch is an electromagnetic clutch of self-locking type and is composed of an annular outer member, an electromagnetic coil contained in a body of the outer member, an armature arranged outside of the outer member and frictionally engageable with the outer side of the outer member by being attracted when electric current is applied to the electromagnetic coil, an inner member located inside of the inner circumference of the outer member coaxially of the same, and a cam mechanism located between the inner member and the armature for coupling these members with each other when operated, wherein the outer member is connected to a transmission member for the drive power output from the electric motor, wherein the inner member is connected to a differential case which is a component of the differential gear, and wherein the cam mechanism makes a first cam member with the armature and a second cam member with a part of the differential case and is constituted by interposing cam followers between the both cam members.

\* \* \* \* \*